(12) United States Patent
Van Zanten et al.

(10) Patent No.: US 12,109,998 B2
(45) Date of Patent: Oct. 8, 2024

(54) FAIL-SAFE BRAKING SYSTEM

(71) Applicant: IPGATE AG, Pfäffikon (CH)

(72) Inventors: Anton Van Zanten, Ditzingen (DE); Thomas Leiber, Rogoznica (HR); Heinz Leiber, Oberriexingen (DE)

(73) Assignee: IPGATE AG, Pfäffikon (CH)

( * ) Notice: Subject to any disclaimer, the term of this patent is extended or adjusted under 35 U.S.C. 154(b) by 455 days.

(21) Appl. No.: 17/429,578

(22) PCT Filed: Feb. 12, 2020

(86) PCT No.: PCT/EP2020/053666
§ 371 (c)(1),
(2) Date: Aug. 9, 2021

(87) PCT Pub. No.: WO2020/165294
PCT Pub. Date: Aug. 20, 2020

(65) Prior Publication Data
US 2022/0126804 A1 Apr. 28, 2022

(30) Foreign Application Priority Data

Feb. 12, 2019 (DE) ...................... 10 2019 103 464.7
Feb. 12, 2019 (DE) ...................... 10 2019 103 483.3
Mar. 21, 2019 (DE) ...................... 10 2019 107 334.0

(51) Int. Cl.
*B60T 8/88* (2006.01)
*B60T 7/04* (2006.01)
(Continued)

(52) U.S. Cl.
CPC .............. *B60T 8/885* (2013.01); *B60T 7/042* (2013.01); *B60T 8/409* (2013.01); *B60T 13/142* (2013.01);
(Continued)

(58) Field of Classification Search
None
See application file for complete search history.

(56) References Cited

U.S. PATENT DOCUMENTS 5,588,718 A 12/1996 Winner et al.
5,986,368 A 11/1999 Wetzel et al.
(Continued)

FOREIGN PATENT DOCUMENTS

CN 101039829 9/2007
CN 101341056 A 1/2009
(Continued)

OTHER PUBLICATIONS

Office Action (First Examination Report) issued on Feb. 17, 2023, by the Intellectual Property India in corresponding India Patent Application No. 202117038290 with English Translation.
(Continued)

*Primary Examiner* — Melanie Torres Williams
(74) *Attorney, Agent, or Firm* — Panitch Schwarze Belisario & Nadel LLP

(57) ABSTRACT

A braking system for a vehicle may include a hydraulic brake pedal system having a master cylinder having at least one pressure chamber, from which a hydraulic output is coupled to at least one brake circuit via an infeed switch valve. The master cylinder is coupled to a reservoir via at least one opening via a hydraulic connection. A failure of a pressure chamber seal of the at least one pressure chamber of the master cylinder is safeguarded by at least one redundancy, and the failure of the pressure chamber seal or the redundancy of the pressure chamber seal of the at least one pressure chamber of the master cylinder can be diagnosed.

19 Claims, 10 Drawing Sheets

(51) Int. Cl.
B60T 8/40 (2006.01)
B60T 13/14 (2006.01)
(52) U.S. Cl.
CPC ..... *B60T 2220/04* (2013.01); *B60T 2270/413* (2013.01)

(56) References Cited

U.S. PATENT DOCUMENTS

| | | |
|---|---|---|
| 5,988,767 A | 11/1999 | Inoue et al. |
| 6,042,200 A | 3/2000 | Hosoya et al. |
| 6,517,170 B1 | 2/2003 | Hofsaess et al. |
| 9,776,604 B2 | 10/2017 | Lee et al. |
| 10,173,659 B2 | 1/2019 | Kim et al. |
| 10,513,249 B2 | 12/2019 | Kim |
| 10,688,979 B2 | 6/2020 | Leiber et al. |
| 11,554,765 B2 | 1/2023 | Leiber et al. |
| 11,565,678 B2 | 1/2023 | Zander et al. |
| 2008/0246334 A1 | 10/2008 | Drescher |
| 2009/0115247 A1 | 5/2009 | Leiber et al. |
| 2010/0001577 A1 | 1/2010 | Hatano |
| 2012/0235469 A1 | 9/2012 | Miyazaki et al. |
| 2013/0103277 A1 | 4/2013 | Attallah et al. |
| 2013/0213025 A1 | 8/2013 | Linden |
| 2014/0203626 A1 | 7/2014 | Biller et al. |
| 2014/0216866 A1 | 8/2014 | Feigel et al. |
| 2015/0203085 A1 | 7/2015 | Maruo et al. |
| 2015/0283987 A1 | 10/2015 | Bareiss |
| 2016/0009263 A1 | 1/2016 | Feigel et al. |
| 2016/0009267 A1 | 1/2016 | Lesinski, Jr. |
| 2016/0023644 A1 | 1/2016 | Feigel et al. |
| 2016/0107629 A1 | 4/2016 | Han |
| 2016/0185329 A1 | 6/2016 | Lee et al. |
| 2016/0221562 A1 | 8/2016 | Leiber et al. |
| 2016/0311422 A1 | 10/2016 | van Zanten et al. |
| 2016/0375886 A1 | 12/2016 | Jung |
| 2017/0015293 A1 | 1/2017 | Yagashira et al. |
| 2017/0106843 A1 | 4/2017 | Jeong |
| 2017/0158184 A1 | 6/2017 | Choi et al. |
| 2017/0182988 A1 | 6/2017 | Kawakami et al. |
| 2017/0327098 A1 | 11/2017 | Leiber et al. |
| 2017/0334417 A1 | 11/2017 | Choi et al. |
| 2017/0361825 A1 | 12/2017 | Drumm et al. |
| 2018/0065605 A1 | 3/2018 | Leiber et al. |
| 2018/0065609 A1 | 3/2018 | Leiber et al. |
| 2018/0126970 A1 | 5/2018 | Leiber et al. |
| 2018/0215366 A1 | 8/2018 | Leiber et al. |
| 2018/0334149 A1 | 11/2018 | Feigel |
| 2019/0031165 A1 | 1/2019 | Besier et al. |
| 2019/0100182 A1 | 4/2019 | Leiber et al. |
| 2019/0344769 A1 | 11/2019 | Zimmermann et al. |
| 2020/0047731 A1 | 2/2020 | Reuter |
| 2020/0079335 A1 | 3/2020 | Linhoff et al. |
| 2020/0079338 A1 | 3/2020 | Roh |
| 2020/0139948 A1 | 5/2020 | Leiber et al. |
| 2020/0139949 A1 | 5/2020 | Dolmaya et al. |
| 2020/0172068 A1 | 6/2020 | Leiber et al. |
| 2020/0406880 A1 | 12/2020 | Zimmermann et al. |
| 2021/0053540 A1 | 2/2021 | Besier et al. |
| 2021/0094524 A1 | 4/2021 | Wetzel |
| 2021/0179051 A1 | 6/2021 | Alford et al. |
| 2021/0245725 A1 | 8/2021 | Courth et al. |
| 2021/0309197 A1 | 10/2021 | Weh et al. |
| 2022/0041150 A1 | 2/2022 | Leiber |
| 2022/0135013 A1 | 5/2022 | Leiber et al. |
| 2023/0356700 A1 | 11/2023 | Jia et al. |
| 2024/0001899 A1 | 1/2024 | Stanojkovski |

FOREIGN PATENT DOCUMENTS

| | | |
|---|---|---|
| CN | 101987616 A | 3/2011 |
| CN | 102414063 | 4/2012 |
| CN | 102616229 | 8/2012 |
| CN | 102639370 | 8/2012 |
| CN | 102822025 | 12/2012 |
| CN | 103253251 | 8/2013 |
| CN | 103318160 | 9/2013 |
| CN | 103347754 | 10/2013 |
| CN | 103874609 | 6/2014 |
| CN | 104640755 | 5/2015 |
| CN | 107107885 | 8/2017 |
| CN | 107428325 A | 12/2017 |
| CN | 107472232 | 12/2017 |
| DE | 4340467 A1 | 6/1995 |
| DE | 19914403 A1 | 10/2000 |
| DE | 10025038 A1 | 11/2001 |
| DE | 10028092 A1 | 12/2001 |
| DE | 10158065 | 6/2003 |
| DE | 10259489 A1 | 7/2004 |
| DE | 10319338 A1 | 11/2004 |
| DE | 102005017958 | 4/2006 |
| DE | 102005055751 A1 | 11/2006 |
| DE | 102007016948 | 8/2008 |
| DE | 102008015241 A1 | 9/2008 |
| DE | 102009008944 A1 | 8/2010 |
| DE | 102009055721 | 6/2011 |
| DE | 102011086258 A1 | 5/2012 |
| DE | 102012210809 A1 | 1/2013 |
| DE | 102012213216 A1 | 2/2013 |
| DE | 102012217825 A1 | 4/2014 |
| DE | 102013217954 A1 | 3/2015 |
| DE | 102013017205 A1 | 4/2015 |
| DE | 102013224783 A1 | 6/2015 |
| DE | 112013004634 T5 | 6/2015 |
| DE | 102014225962 | 6/2016 |
| DE | 202015008975 U1 | 6/2016 |
| DE | 102015103858 | 9/2016 |
| DE | 102015104246 A1 | 9/2016 |
| DE | 112015002162 T5 | 1/2017 |
| DE | 102016222765 A1 | 5/2017 |
| DE | 102016105232 A1 | 9/2017 |
| DE | 102016203563 A1 | 9/2017 |
| DE | 102017219257 A1 | 4/2018 |
| DE | 102016225537 A1 | 6/2018 |
| DE | 102017200955 A1 | 7/2018 |
| DE | 102017219598 A1 | 7/2018 |
| DE | 102017222435 A1 | 7/2018 |
| DE | 102017222450 A1 | 7/2018 |
| DE | 102017207954 A1 | 11/2018 |
| DE | 102017113563 A1 | 12/2018 |
| DE | 102017212016 A1 | 1/2019 |
| DE | 102018111126 A1 | 11/2019 |
| DE | 102019219158 A1 | 6/2021 |
| EP | 280740 A1 | 9/1988 |
| EP | 2881292 A1 | 6/2015 |
| EP | 2883766 A1 | 6/2015 |
| EP | 2744691 B1 | 7/2015 |
| EP | 3225480 A1 | 10/2017 |
| EP | 3225481 A1 | 10/2017 |
| EP | 3333031 A1 | 6/2018 |
| GB | 589075 | 6/1947 |
| GB | 8514135 | 7/1985 |
| GB | 2160273 | 12/1985 |
| GB | 8703148 | 2/1987 |
| GB | 2186932 A | 8/1987 |
| JP | H8282459 A | 10/1996 |
| JP | H10329699 A | 12/1998 |
| JP | 2001097201 | 4/2001 |
| KR | 20090077182 | 7/2009 |
| KR | 20170012348 | 2/2017 |
| WO | 2006111393 A1 | 10/2006 |
| WO | 2012034661 | 3/2012 |
| WO | 2012059175 A1 | 5/2012 |
| WO | 2012146461 A1 | 11/2012 |
| WO | 2013010554 A1 | 1/2013 |
| WO | 2013037568 A1 | 3/2013 |
| WO | 2014135446 A2 | 9/2014 |
| WO | 2015024795 A1 | 2/2015 |
| WO | 2015032637 A1 | 3/2015 |
| WO | 2015106892 A1 | 7/2015 |
| WO | 2016012331 A1 | 1/2016 |
| WO | 2016023994 A1 | 2/2016 |
| WO | 2016023995 A1 | 2/2016 |
| WO | 2016120292 A1 | 8/2016 |

(56) References Cited

FOREIGN PATENT DOCUMENTS

| WO | 2016146223 A2 | 9/2016 |
| WO | 2017055152 A1 | 4/2017 |
| WO | 2017148968 A1 | 9/2017 |
| WO | 2017153072 | 9/2017 |
| WO | 2018019671 A1 | 2/2018 |
| WO | 2018130482 A1 | 7/2018 |
| WO | 2018130483 A1 | 7/2018 |
| WO | 2018210534 A1 | 11/2018 |
| WO | 2018234387 A1 | 12/2018 |
| WO | 2019002475 A1 | 1/2019 |
| WO | 2019215283 A1 | 11/2019 |

OTHER PUBLICATIONS

Office Action issued May 16, 2023 in Chinese Application No. 202080021255.X with English Translation.

Office Action issued May 17, 2023 in Chinese Application No. 202080021265.3 with English Translation.

Office Action issued May 22, 2023 in Chinese Application No. 202080022277.8 with English Translation.

Int'l Search Report and Written Opinion issued Oct. 22, 2019 in Int'l Application No. PCT/EP2019/068596, English translation of Int'l Search Report only.

Int'l Search Report and Written Opinion issued Oct. 30, 2019 in Int'l Application No. PCT/EP2019/057123, English translation of Int'l Search Report only.

Int'l Search Report and Written Opinion issued Nov. 4, 2019 in Int'l Application No. PCT/EP2019/068592, English translation of Int'l Search Report only.

Int'l Search Report and Written Opinion issued Apr. 1, 2020 in Int'l Application No. PCT/EP2020/053626, English translation of Int'l Search Report only.

Int'l Search Report and Written Opinion issued Apr. 28, 2020 in Int'l Application No. PCT/EP2020/053609, English translation of Int'l Search Report only.

Int'l Search Report and Written Opinion issued Apr. 28, 2020 in Int'l Application No. PCT/EP2020/053613, English translation of Int'l Search Report only.

Int'l Search Report and Written Opinion issued May 19, 2020 in Int'l Application No. PCT/EP2020/053665, English translation of Int'l Search Report only.

Int'l Search Report and Written Opinion issued May 19, 2020 in Int'l Application No. PCT/EP2020/053668, English translation of Int'l Search Report only.

Int'l Search Report and Written Opinion issued Jun. 5, 2020 in Int'l Application No. PCT/EP2020/053667, English translation of Int'l Search Report only.

Int'l Search Report and Written Opinion issued Oct. 9, 2020 in Int'l Application No. PCT/EP2020/053666, English translation of Int'l Search Report only.

Search Report issued Dec. 20, 2019 in DE Application No. 10 2019 103 464.7.

Search Report issued Jan. 3, 2020 in DE Application No. 10 2019 103 483.3.

Search Report issued Apr. 2, 2020 in DE Application No. 10 2019 107 334.0.

Office Action issued Apr. 20, 2023 in European Aplication No. 19714344.9-1012 with English Translation.

Office Action issued Mar. 28, 2023 in Japanese Aplication No. 2021-547138 with English Translation.

Office Action issued Dec. 28, 2023 in U.S. Appl. No. 17/429,593.

Office Action issued Oct. 24, 2023 in U.S. Appl. No. 17/426,615.

Notice of Allowance issued Jan. 24, 2024 in U.S. Appl. No. 17/429,608.

Corrected Notice of Allowance issued Feb. 1, 2024 in U.S. Appl. No. 17/429,608.

Office Action issued Mar. 16, 2022 in U.S. Appl. No. 17/429,620.

Office Action issued Jan. 25, 2024 n European Aplication No. 20706153.2-1012 with English Translation.

Office Action issued Feb. 29, 2024 in U.S. Appl. No. 17/429,423.

Office Action issued Nov. 24, 2023 in U.S. Appl. No. 17/429,562.

Notice of Allowance issued Mar. 6, 2024 in U.S. Appl. No. 17/429,615.

Office Action issued Dec. 7, 2023 in U.S. Appl. No. 17/429,578.

Office Action issued Mar. 14, 2024 in U.S. Appl. No. 17/429,562.

Office Action issued Mar. 28, 2024 in U.S. Appl. No. 17/429,527.

Notice of Allowance issued Mar. 27, 2024 in U.S. Appl. No. 17/429,608.

Office Action issued Feb. 15, 2024 in European Application No. 19 742 145.6-1012 with English translation.

Office Action issued Mar. 12, 2024 in JP Application No. 2021-547137 with English Translation.

English Translation of WO 2017/148968 to Besier et al. Published on Sep. 8, 2017.

English Translation of WO 2018/130482 to Biller et al. Published on Jul. 19, 2018.

English Translation of WO 2015/106892 to Linhoff et al. obtained from website: <https://worldwide. espacenet.com> on May 28, 2024.

English Translation of German Patent No. DE 102012210809 to Strecker et al. obtained from website: <https:// worldwide.espacenet. com> on May 28, 2024.

Office Action issued Jun. 3, 2024 in U.S. Appl. No. 17/429,380.

FAIL-SAFE BRAKING SYSTEM

CROSS-REFERENCE TO RELATED APPLICATIONS

This application is a Section 371 of International Application No. PCT/EP2020/053666, filed Feb. 12, 2020, which was published in the German language on Aug. 20, 2020 under International Publication No. WO 2020/165294 A8, which claims priority under 35 U.S.C. § 119(b) to German Patent Application No. 10 2019 103 483.3, filed Feb. 12, 2019, German Patent Application No. 10 2019 103 464.7, filed Feb. 12, 2019, and German Patent Application No. 10 2019 107 334.0, filed Mar. 21, 2019, the disclosures of which are incorporated herein by reference.

TECHNICAL FIELD

The present invention relates to a hydraulic brake system which is safeguarded against failures.

BACKGROUND

The requirements, in particular safety requirements (for example two-circuit brake system), have a major influence on the design of a brake system and become more stringent with the degree of automation (levels zero to five of the SAE J3016 standard) of the motor vehicle. For example, in the case of autonomous driving for level one or higher (for example for an adaptive cruise control system), the braking force must be ensured even without an actuation of a brake pedal by the driver of a vehicle. This requires at least one pressure provision unit in a hydraulic brake system and a correspondingly configured electronic sensor and control unit. The acceptance of faults is likewise dependent on the automation level. In level two, individual faults are allowed if braking operations with at least approximately 0.3 g are possible, whereas, in level three, even braking operations with at least approximately 0.5 g should be ensured in the event of individual faults. For level three and higher, the ABS/ESP function must likewise be ensured even in the event of an individual fault. In general, double faults are accepted if the probability of failure based on ppm and FIT data is low. It is desirable that double faults with total brake failure do not occur.

SUMMARY OF THE INVENTION

The present invention relates to a brake system having two brake circuits. At least the requirements of level two according to the SAE J3016 standard are preferably met, wherein individual faults can be identified in good time through redundancies and diagnostics and double faults have an extremely low probability of failure.

According to a first aspect, the invention relates to a brake system for a vehicle, comprising the following components:
- at least one hydraulic brake circuit (BK1, BK2) with at least one hydraulically acting wheel brake (RB1, RB2, RB3, RB4);
- at least one pressure supply device (DV), which is connected via a hydraulic line to a brake circuit (BK1, BK2);
- and a hydraulic brake pedal system having a master cylinder with at least one pressure chamber, of which a hydraulic output is coupled, in a manner switchable by means of an infeed switching valve (FV), to at least one brake circuit (BK1, BK2), and wherein the master cylinder is, by way of at least one opening, coupled by means of a hydraulic connection to a reservoir (VB); optionally wherein
- a failure of a pressure chamber seal of the at least one pressure chamber of the master cylinder is safeguarded against by means of at least one redundancy, and wherein the failure of the pressure chamber seal or of the redundancy of the pressure chamber seal of the at least one pressure chamber of the master cylinder is diagnosable.

Aspect 2: The brake system according to aspect 1, furthermore comprising a switching valve (AV, SV1, SV2, SV3, SV4) for each hydraulically acting wheel brake (RB1, RB2, RB3, RB4), which switching valve switchably connects in each case one hydraulically acting wheel brake (RB1, RB2, RB3, RB4) to one of the two brake circuits (BK1, BK2).

Aspect 3: The brake system according to aspect 1 or 2, furthermore comprising at least one hydraulic connection, which is switchable by means of at least one bypass switching valve (BP1), between the two brake circuits (BK1 and BK2).

Aspect 4: The brake system according to any one of the preceding aspects, wherein the brake system has a single master cylinder (SHZ).

Aspect 5: The brake system according to any one of the preceding aspects, wherein the brake system has an open-loop and closed-loop control unit (ECU).

Aspect 6: The brake system according to any one of the preceding aspects, wherein the master cylinder has a force-travel sensor (KWS) for ascertaining the pedal force, and/or wherein the master cylinder has a pressure transducer for detecting the pressure in the at least one pressure chamber of the master cylinder, wherein the brake system optionally has at least one pedal travel sensor (Sp1, Sp2).

Aspect 7: The brake system according to any one of the preceding aspects, wherein at least one pressure chamber of the hydraulic brake pedal system is connected by means of a hydraulic valve circuit to a travel simulator (WS).

Aspect 8: The brake system according to aspect 7, wherein a failure of a pressure chamber seal of the pressure chamber of the travel simulator (WS) is safeguarded against by means of at least one further redundancy, and the failure of the pressure chamber seal of the at least one pressure chamber of the travel simulator (WS) is diagnosable.

Aspect 9: The brake system according to aspect 7 or 8, wherein the pressure chamber of the travel simulator (WS) is sealed off by means of a travel simulator seal (D3).

Aspect 10: The brake system according to aspect 9, wherein the pressure chamber of the travel simulator (WS) has at least one second travel simulator seal (D3r) which is redundant with respect to the travel simulator seal (D3) and which serves for the pressure chamber sealing of the at least one pressure chamber of the travel simulator (WS).

Aspect 11: The brake system according to aspect 10, wherein the travel simulator (WS) has a travel simulator opening between the travel simulator seal (D3) and the redundant travel simulator seal (D3r), which travel simulator opening is connected via a third throttle (Dr3) to the reservoir (VB).

Aspect 12: The brake system according to any one of aspects 9 to 11, wherein the travel simulator seal (D3) is the pressure chamber seal of the pressure chamber of the travel simulator (WS).

Aspect 13: The brake system according to aspect 12, wherein the open-loop and closed-loop control unit (ECU) is adapted to diagnose the failure of the travel simulator seal (D3), optionally using the pressure supply device (DV).

Aspect 14: The brake system according to aspect 13, wherein the force-travel sensor (KWS) is not used for the diagnosis.

Aspect 15: The brake system according to aspect 12, wherein the open-loop and closed-loop control unit (ECU) is adapted to diagnose the failure of the travel simulator seal (D3) using the force-travel sensor (KWS) and/or the pressure transducer.

Aspect 16: The brake system according to any one of the preceding aspects, wherein the opening is sealed off by at least one primary seal (D2) and optionally at least one secondary seal (D1).

Aspect 17: The brake system according to any one of the preceding aspects, wherein the hydraulic connection has a parallel circuit of a throttle (Dr1) and a check valve (RV1) which closes in the direction of the reservoir (VB).

Aspect 18: The brake system according to aspect 16 or 17, wherein the primary seal (D2) is the pressure chamber seal of the at least one pressure chamber of the master cylinder.

Aspect 19: The brake system according to aspect 18, wherein the open-loop and closed-loop control unit (ECU) is adapted to diagnose the failure of the primary seal (D2) using the force-travel sensor (KWS) and/or the pressure transducer.

Aspect 20: The brake system according to aspect 17, wherein the throttle (Dr1) and the check valve (RV1) which closes in the direction of the reservoir (VB) is the redundancy of the pressure chamber seal of the at least one pressure chamber of the master cylinder.

Aspect 21: The brake system according to aspect 20, wherein the open-loop and closed-loop control unit (ECU) is adapted to diagnose the failure of the redundancy of the pressure chamber seal, optionally using the pressure supply device (DV).

Aspect 22: The brake system according to any one of aspects 16 to 21, wherein the open-loop and closed-loop control unit (ECU) is adapted to diagnose a failure of the secondary seal (D1), optionally using the pressure supply device (DV).

Aspect 23: The brake system according to any one of the preceding aspects, wherein the reservoir (VB) has a level transducer by means of which the fill level of the reservoir can be detected.

Aspect 24: The brake system according to aspect 23, wherein a failure of the secondary seal (D1) is diagnosable by means of the level transducer of the reservoir (VB), in particular during the course of maintenance, in the case of which a pressure of for example approximately 5 bar is generated in the reservoir (VB).

Aspect 25: The brake system according to any one of aspects 21 to 24, wherein the force-travel sensor (KWS) is not used for the diagnosis.

Aspect 26: The brake system according to any one of the preceding aspects, wherein the master cylinder has at least one secondary seal (D1r) which is redundant with respect to the secondary seal (D1).

Aspect 27: The brake system according to aspect 26, wherein the master cylinder has a further opening between the secondary seal (D1) and the redundant secondary seal (D1r), which further opening is connected via a further throttle (Dr4) to the reservoir (VB).

Aspect 28: The brake system according to any one of the preceding aspects, wherein the master cylinder has at least one primary seal (D2r) which is redundant with respect to the primary seal (D2) and which serves for the pressure chamber sealing.

Aspect 29: The brake system according to aspect 26, wherein the hydraulic connection has a valve ($V_D$) which shuts off when a predetermined threshold volume flow in a flow direction from the master cylinder to the reservoir (VB) is exceeded, and which is always open in the opposite flow direction.

Aspect 30: The brake system according to aspect 28 or 29, wherein the open-loop and closed-loop control unit (ECU) is adapted to diagnose a failure of the redundant primary seal (D2r) using the force-travel sensor (KWS) and/or the pressure transducer.

Aspect 31: The brake system according to aspect 29 or 30, wherein the open-loop and closed-loop control unit (ECU) is adapted to diagnose a failure of the valve ($V_D$), optionally using the pressure supply device (DV).

Aspect 32: The brake system according to any one of the preceding aspects, wherein the hydraulic connection has a switchable solenoid valve (17).

Aspect 33: The brake system according to aspect 32, wherein the master cylinder has at least one redundant primary seal (D2r), wherein the master cylinder has, between the at least one redundant primary seal (D2r) and the at least one primary seal (D2), at least one further opening which is likewise connected, in a manner switchable by means of the switchable solenoid valve (17), to the reservoir (VB).

Aspect 34: The brake system according to aspect 32 or 33, wherein the master cylinder has, between the at least one redundant secondary seal (D1r) and the at least one secondary seal (D1), at least one further opening which is connected via a further throttle (Dr4) to the reservoir (VB).

Aspect 35: The brake system according to any one of aspects 32 to 34, wherein the open-loop and closed-loop control unit (ECU) is adapted to diagnose a failure of the switchable solenoid valve (17) using the force-travel sensor (KWS).

Aspect 36: The brake system according to any one of aspects 32 to 34, wherein the open-loop and closed-loop control unit (ECU) is adapted to diagnose a failure of the switchable solenoid valve (17), optionally using the pressure supply device (DV), wherein the force-travel sensor (KWS) is not used for the diagnosis.

Aspect 37: The brake system according to any one of the preceding aspects, wherein each hydraulically acting wheel brake (RB1, RB2, RB3, RB4) is assigned a switchable inlet valve (EV), and wherein the switching valves (AV) of each hydraulically acting wheel brake (RB1, RB2, RB3, RB4) is connected to the reservoir (VB).

Aspect 38: The brake system according to any one of the preceding aspects, wherein the brake system furthermore has at least one hydraulic connection, which is switchable by means of at least one outlet switching valve (ZAV), between at least one of the brake circuits (BK1, BK2) and the reservoir (VB).

Aspect 39: The brake system according to aspect 38, wherein a pressure reduction in the at least one hydraulically acting wheel brake (RB1, RB2, RB3, RB4) is performed by opening of the outlet switching valve (ZAV) and of the associated switching valve (SV1, SV2, SV3, SV4).

Aspect 40: The brake system according to aspect 38 or 39, wherein the two hydraulic brake circuits (BK1, BK2) are connected to one another via the bypass switching valve (BP1) and a further bypass switching valve (BP2), which are connected in series, wherein the outlet switching valve (ZAV) is connected to a line section between the two bypass switching valves (BP1, BP2).

Aspect 41: The brake system according to any one of the preceding aspects, wherein the pressure reduction in the at least one hydraulically acting wheel brake (RB1, RB2, RB3, RB4) can be performed by means of the master cylinder.

Aspect 42: The brake system according to any one of the preceding aspects, wherein the brake system has a first resetting spring (RF1) and optionally a second resetting spring (RF2), wherein the second resetting spring (RF2) counteracts a possible pedal collapse.

Aspect 43: The brake system according to any one of the preceding aspects, wherein the at least one pressure chamber of the master cylinder is connected to the infeed switching valve (FV) via an interposed back pressure valve (19).

Aspect 44: The brake system according to aspect 43, wherein the back pressure valve (19) acts as a throttle in the direction of the infeed switching valve (FV) in the presence of pressures above a predetermined pressure originating from the master cylinder in the direction of the infeed switching valve (FV), and imparts no substantial throttling action in the opposite direction.

Aspect 45: The brake system according to any one of the preceding aspects, wherein the brake system has at least two hydraulic brake circuits (BK1, BK2).

DETAILED DESCRIPTION

Figure 1A:
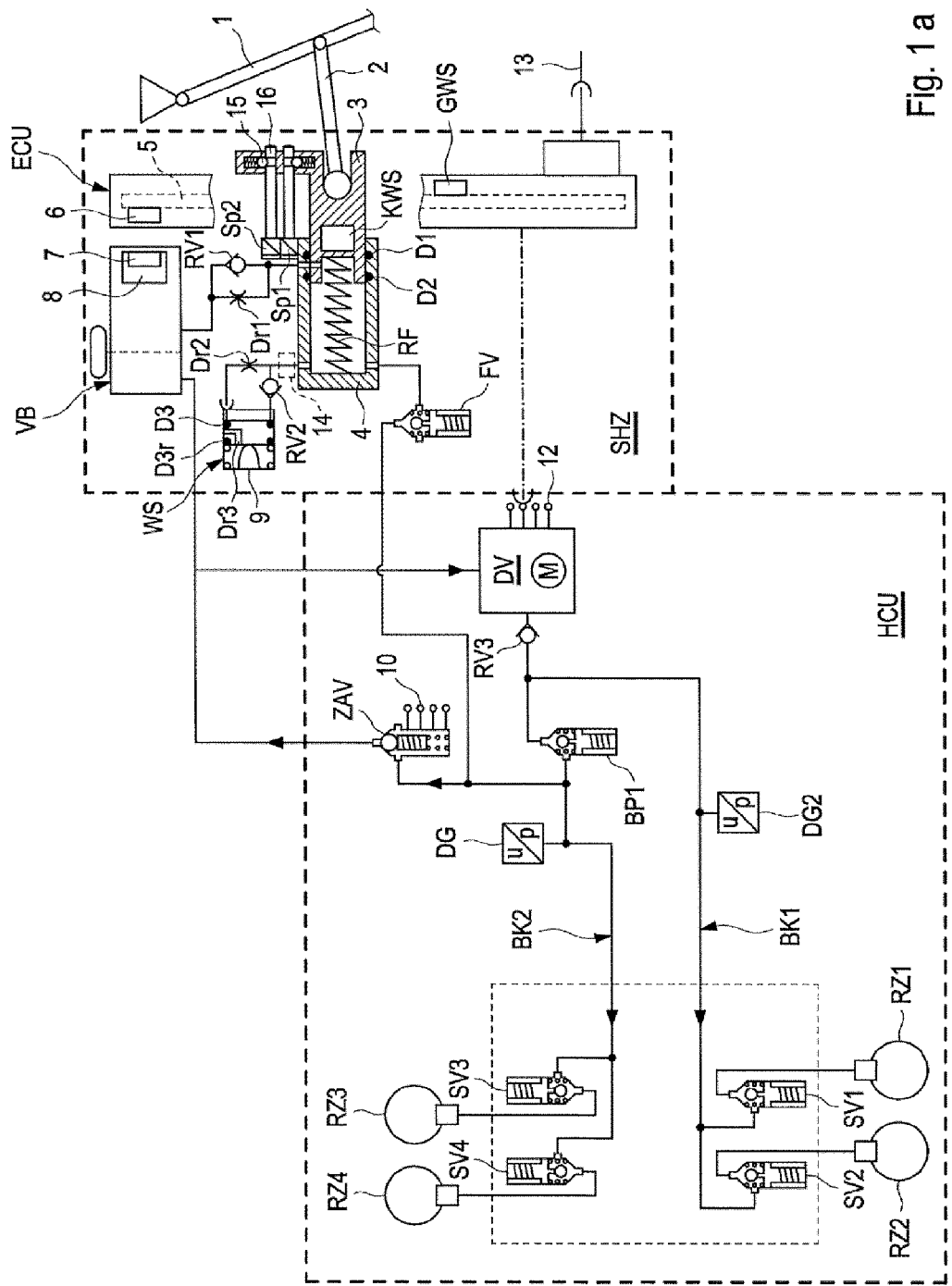
FIG. 1a shows a first possible embodiment of the brake system according to the invention in a minimal valve arrangement in the HCU with a bypass valve (BP1) and a central outlet valve (ZAV).

FIG. 1a shows elements of a hydraulic brake system having a single master cylinder unit (SHZ) with brake pedal (1), single master cylinder and reservoir (VB), having a pressure supply device (DV), having an electronic control unit (ECU) and having, for each wheel, a wheel brake (RB1, RB2, RB3, RB4) (not shown) with in each case one wheel cylinder (RZ1, RZ2, RZ3, RZ4). Pressure supply device (DV) and pressure provision unit are used synonymously here. Two wheel cylinders (RZ1, RZ2) are connected in each case via a switching valve (SV1, SV2) to a first brake circuit (BK1) and a further two wheel cylinders (RZ3, RZ4) are connected in each case via a switching valve (SV3, SV4) to a second brake circuit (BK2). Instead of one switching valve per wheel cylinder, it is also possible for two or more switching valves to be provided for each wheel cylinder. The pressure provision unit (DV) comprises a pump and a brushless DC motor, which optionally has a redundant winding and/or is connected to the electronic control unit (ECU) via 2×3 phases. The pump may be a plunger pump (not shown) with a spindle drive or a rotary pump, wherein the rotary pump may in turn be designed as a multi-piston pump (for example as a three-piston pump) or as a gear pump. In the case of a gear pump that can rotate in both directions, the pressure provision unit (DV) may be connected to the first brake circuit (BK1) via a check valve (RV3) that closes toward the pressure provision unit (DV). In the case of a multi-piston pump that can deliver volume only in one direction, the pressure provision unit (DV) may be connected to the first brake circuit (BK1) directly (without RV3). One or more check valves may be integrated in the multi-piston pump. In the case of a plunger pump, a solenoid valve (not shown) is required instead of the check valve RV3. In addition, the plunger or rotary pump may be connected to the reservoir (VB). The two brake circuits (BK1 and BK2) are connected via a switchable bypass valve (BP1). The second brake circuit (BK2) is connected via a switchable central outlet valve (ZAV) to the reservoir (VB) and via a switchable infeed switching valve (FV) to a hydraulic output of the pressure chamber of the single master cylinder. As an alternative to the single master cylinder, a double master cylinder with corresponding connection, as shown for example in FIG. 5a or FIG. 5b, may also be used for additionally increased safety. The pressure in one of the two brake circuits (for example BK2) may be measured by means of a pressure sensor (for example DG) on said brake circuit (for example BK2) and transmitted to the ECU. Optionally, further pressures in the brake circuits (for example BK1) may also be measured by means of further pressure sensors (for example DG2) and transmitted to the ECU. The hydraulic arrangement with the wheel cylinders (RZ1, RZ2, RZ3, RZ4), the switching valves (SV1, SV2, SV3, SV4), the two brake circuits (BK1, BK2), the pressure sensors (DG1, DG2), the bypass valve (BP1), the central outlet valve (ZAV), the pressure provision unit (DV) and, if present, the check valve (RV3) may be combined in a so-called hydraulic control unit (HCU). In a preferred embodiment, the hydraulic control unit (HCU) has only exactly one pressure supply (DV).

In the single master cylinder unit (SHZ), it is additionally possible for a travel simulator (WS) with or without a switchable travel simulator isolation valve (14) to be connected to a further hydraulic output of the single master cylinder (or to the hydraulic line between infeed switching valve (FV) and single master cylinder). The travel simulator can transmit a certain pedal travel-force characteristic to the brake pedal (1) by means of a slave piston which, for example as a result of foot-imparted actuation of the brake pedal (1), can be displaced counter to an arrangement of resetting springs. The hydraulic connection of the travel simulator (WS) to the single master cylinder may be implemented, as illustrated in FIG. 1a, for example by means of a parallel connection with a throttle (Dr2) and a check valve (RV2) or in some other way. The pedal movement can be reduced as pressure builds up across throttle Dr2, and, during the evacuation of the travel simulator (WS), the throttle Dr2 can be bypassed via the check valve RV2.

In the normal situation, in particular when a power supply and a functional pressure supply DV are present, a braking operation is performed by means of a brake pedal actuation by the driver, wherein, during the brake pedal actuation, the infeed switching valve (FV) is closed and is kept closed for as long as the brake pedal (1) remains depressed. The pedal system is thus hydraulically decoupled from the hydraulic control unit (HCU). Instead, the coupling takes place in "brake-by-wire" form by means of the redundantly configured pedal travel sensors, the ECU and the pressure provision unit DV, which, when the switching valves (SV1, SV2, SV3, SV4) are open, the bypass valve (BP1) is open and the central outlet valve (ZAV) is closed, can deliver brake fluid volume from the reservoir (VB) into the wheel cylinders (RZ1, RZ2, RZ3, RZ4) of both brake circuits (BK1, BK2) and thereby build up brake pressure. Depending on the desired braking force and further boundary conditions, the bypass valve (BP1) may also be closed during a normal braking operation if braking is to be performed only by means of the wheel cylinders (RZ1, RZ2) in the first brake circuit (BK1). By means of the at least one pressure sensor (DG) in one of the brake circuits (BK1, BK2), and/or pulse width modulation of the switching valves (SV1, SV2, SV3, SV4) and/or of the bypass valve (BP1), a target pressure can be set by closed-loop control in a manner dependent on the pedal travel. By means of the travel simulator (WS) and the resetting spring (RF) in the single master cylinder, the driver is provided with a certain pedal travel-force characteristic, which may preferably always be as constant as possible and independent of the brake pressures in the brake circuits (BK1, BK2). In particular, the combination of travel simulator (WS) and resetting spring (RF) in the "brake-by-wire" system counteracts a collapse of the brake pedal and brings the pedal back into a defined starting position after the foot-imparted actuation. In particular in the case of electric vehicles or hybrid vehicles, the recovery of braking energy (recuperation) in the electric traction motors can thus be decoupled from the brake pedal (1). In particular, the pedal travel-force characteristic is not influenced even in the non-normal situation, for example in the event of failure of a brake circuit.

When the brake pedal force is released, the central outlet valve (ZAV) can be opened, in particular in the case of a rotary pump being used. In addition, the switching valves (SV1, SV2, SV3, SV4) and/or the bypass valves (BP1, BP2) are opened fully, or in a manner dependent on the desired pressure reduction gradient by means of pulse width modulation (PWM) or short stoppages (for example after a time $\Delta t$ or after a differential pressure $\Delta p$), or in some other way. As a result, the brake fluid volume can be returned into the reservoir (VB) and brake pressure can be reduced. If the piston (3) of the single master cylinder returns into the defined starting position after the foot-imparted actuation of the brake pedal (1) has ended, the exchange of brake fluid between the pressure chamber of the single master cylinder and the reservoir (VB) may take place through for example radial breather openings in the piston (3) and in the single master cylinder and via a hydraulic connection. This hydraulic connection may be implemented, as in FIG. 1a, by means of a parallel connection of a throttle (Da) and a check valve (RV1) or in some other way. The sealing of the pressure chamber in the single master cylinder may be realized by means of a primary seal (D2) and a secondary seal (D1) and further redundant seals (not illustrated), wherein, in particular, the primary seal (D2) may be attached in the single master cylinder or on the piston (3) of the single master cylinder.

In the normal situation, individual brake pressures for driving dynamics interventions such as ABS or ESP can be set by closed-loop control for each wheel. The closed-loop control function for ABS, for example, is as follows: If, during the pressure build-up $P_{build-up}$, the closed-loop controller signals that a brake cylinder (for example RZ1) of a wheel satisfies for example the criterion of excessive brake pressure, then, for the observation of the wheel, the pressure build-up $P_{build-up}$ can be stopped or (possibly after such an observation time) the brake pressure can be reduced by pressure reduction $P_{reduction}$. Since the infeed switching valve (FV) remains closed here and, depending on the embodiment, the pump in the pressure provision unit (DV) cannot admit any volume from the brake circuits, the opening of the central outlet valve (ZAV) constitutes the only option for pressure reduction $P_{reduction}$ in one possible configuration. When the central outlet valve (ZAV) is open, different pressure reduction gradients can then be set by closed-loop control, preferably through the PWM control of the associated switching valve (for example SV1). If the pressure reduction $P_{reduction}$ is stopped by the closed-loop controller, the central outlet valve (ZAV) is closed again. It is also possible for two, three or four wheel cylinders to be controlled simultaneously and on a wheel-specific basis during the pressure reduction $P_{reduction}$. The pressure build-up $P_{build-up}$ can likewise be controlled in one wheel cylinder or in two, three or four wheel cylinders simultaneously and on a wheel-specific basis as required.

In the case of an intervention by a driver assistance system that is customary in partially automated driving (level 2), such as in the case of an adaptive cruise control system or traffic jam assistant, a braking operation can be carried out even without pedal actuation by the driver by means of the pressure provision unit (DV), wherein the brake pedal (1) is hydraulically decoupled from such an intervention by the then-closed infeed switching valve (FV).

Based on the so-called conventional three-box systems (brake system with ABS/ESP functionality, vacuum brake booster and electrical or mechanical vacuum pump) and on the so-called conventional two-box systems (brake system with ABS/ESP functionality and electromotive brake booster unit), the "brake-by-wire" brake system according to the invention with travel simulator (WS), electromotive pressure provision unit (DV) and ABS/ESP functionality can be referred to as a so-called one-box system. Owing to the high degree of integration of such a one-box system, the installation space, weight and costs of the entire structural unit can be reduced and, in addition, installation and logistics can be optimized.

The valves FV, BP1, SV1, SV2, SV3, SV4 may be designed as solenoid valves which are open when electrically deenergized, whereas the valves ZAV and, if present, the travel simulator isolation valve (14) are preferably solenoid valves which are closed when electrically deenergized. Furthermore, the switching valves (SV1, SV2, SV3, SV4) are preferably connected via their output side to the respective wheel cylinders (RZ1, RZ2, RZ3, RZ4) such that each switching valve (SV1, SV2, SV3, SV4), in the event of a fault, for example in the event of failure of its electrical connection, automatically opens owing to the pressure in the respective wheel cylinder (RZ1, RZ2, RZ3, RZ4). By means of this valve configuration, it can in particular be ensured that, in the absence of a power supply, the brake pedal (1) can be hydraulically coupled to the wheel cylinders (RZ1, RZ2, RZ3, RZ4) via the open infeed switching valve (FV) and brake pressure can be built up. If the travel simulator isolation valve (14), which is closed when electrically deenergized, is present, the travel simulator (WS) can furthermore be decoupled from the brake pedal (1), whereby, for example, approximately 40% pedal travel can be saved.

All solenoid valves, in particular the ZAV, may each be designed as a redundant valve and/or with a redundant coil and/or with redundant control, whereby the probability of a valve failure can be reduced. In the event of a single failure with a probability of 1e-6 per year, for example, redundancy with the same failure probability can reduce the failure probability per year to 1e-6×1e-6=1e-12.

Also, if a power supply is present and the pressure provision unit (DV) fails, the valves FV, BP1, SV1, SV2, SV3, SV4 can be opened and the valves ZAV and, if present, the travel simulator isolation valve (14) can be closed, such that brake pressure can be built up by way of the brake pedal actuation. Alternatively, the bypass valve (BP1) can be closed and sufficient brake pressure can still be built up in the second brake circuit (BK2) by foot-imparted actuation of the brake pedal (1). The failure of the electrical control of the pressure provision unit (DV) can be classified as very unlikely, in particular in the preferred embodiments with a (single) multi-piston or gear pump and by means of redundant windings with 2×3 phase control. Since a failure of the power supply is also unlikely, the travel simulator isolation valve (14) can be omitted.

According to the invention, the brake system may have various sensors, in particular pressure sensors (DG, DG2), redundant pedal travel sensors (Sp1 and Sp2) for ascertaining the pedal travel, a force-travel sensor (KWS) in the piston of the single master cylinder for ascertaining a force-pedal travel characteristic, a fill level sensor element (6) for ascertaining the fill level of the brake fluid in the reservoir (VB), a yaw angle sensor (GWS) for ESP interventions, for example, or further sensors (for example a temperature sensor) whose sensor values can be transmitted to the electronic control unit (ECU). Alternatively or in addition to the force-travel sensor (KWS), a pressure sensor (not shown) may be integrated into the single master cylinder, which pressure sensor can detect the pressure in the pressure chamber and transmit this to the ECU. Furthermore, it is also possible for all solenoid valves, in particular the valves SV1, SV2, SV3, SV4, BP1, ZAV, FV, 14, to be switched by the electronic control unit (ECU) preferably by way of redundant electronic control or by means of a redundant coil. In single-box devices with ABS/ESP, the electronic control unit (ECU) may be attached to the hydraulic control unit (HCU) and preferably connected by means of a plug connector (13) to the on-board electrical system of the vehicle, wherein the bus communication may be implemented for example by FlexRay or CAN or in some other form.

The redundant pedal travel sensors (Sp1 and Sp2) may be implemented in different ways. In FIG. 1a, two sensor rods are moved by a projection of the single master cylinder piston (3), which sensor rods act on the redundant pedal travel sensors (Sp1 and Sp2). In order to prevent blocking of the rods, detent elements may be accommodated in a projection of the piston (3). The redundant pedal travel sensors (Sp1 and Sp2) may also be coupled to two pistons and a spring between the two pistons. This has the advantage that force-travel measurement can thus be realized with additional advantages in terms of the fault analysis, for example with regard to a jamming piston (3), see also DE102010050132.

Further fault situations, the consequences thereof and the detection thereof through diagnostics will be discussed below.

A loss of braking force caused by a leaking seal in one of the wheel cylinders (RZ1, RZ2, RZ3, RZ4) can, through a comparison with a predetermined pressure-volume characteristic for the pressure build-up $P_{build-up}$, which can be dependent on various boundary conditions such as valve positions, temperature, ventilation of the brake system, clearance of the wheel brakes (RB1, RB2, RB3, RB4), etc., be identified from the additional admission of lost volume or the additional delivery of volume by the pressure provision unit (DV). The wheel cylinder in which the loss of braking force occurs can be localized using the following diagnosis: After a pressure build-up $P_{build-up}$ has occurred, all switching valves (SV1, SV2, SV3, SV4) are open and the pressure provision unit (DV) is no longer electrically energized if there is residual pressure in the brake circuits (BK1, BK2). After closure of the bypass valve (BP1), the pressure measured by the pressure sensor (DG) in the second brake circuit (BK2) can be examined. If the pressure drops, wheel cylinders RZ3 and/or RZ4 must be leaking. By closing switching valve SV3, for example, it is then possible for a leak in the wheel cylinder RZ4 to be identified in the event of falling pressure or for a leak in the wheel cylinder RZ3 to be identified in the case of constant pressure. If, on the other hand, the pressure remains constant after the bypass valve (BP1) has been closed, the wheel cylinders RZ3 and RZ4 can be identified as being leak-tight. In this case, the bypass valve (BP1) is opened and the switching valves SV1, SV3 and SV4 are closed. If the pressure drops, the leak can be identified as being in the wheel cylinder RZ2, whereas in the case of constant pressure, the leak can be identified as being in the wheel cylinder RZ1. After the wheel cylinder (for example RZ1) with a loss of braking force has been localized, the associated switching valve (for example SV1) can be closed before every braking operation until the unit is replaced during servicing work, such that deceleration remains possible by means of two or three wheel cylinders (for example RZ2, RZ3, RZ4) with a braking force that is reduced but sufficient for level two autonomous driving. If a small leak is identified in a wheel cylinder as described above, the leak can be compensated for through replenishment by means of the pressure provision unit (DV) as an alternative to shutting down the wheel cylinder.

After all of the switching valves SV1, SV2, SV3, SV4 have been closed, the leak-tightness of the central outlet valve ZAV and of the infeed switching valve FV can be checked, preferably in a standstill state with or without volume delivery by means of the pressure provision unit (DV), by virtue of the valves ZAV and FV being alternately closed and opened. If a possible leak can be localized in the ZAV or FV for example by way of a pressure oscillation from the pressure provision unit (DV) and by way of an interaction between the fill level sensor element (6) in the reservoir (VB) and pedal movement, the following measures can be distinguished: In the case of a central outlet valve (ZAV) which is blocked for example by a dirt particle and no longer seals, or if the central outlet valve (ZAV) can no longer be closed after failure of the electrical control, the bypass valve (BP1) can be closed, wherein, then, sufficient brake pressure can still be built up at least in the first brake circuit by means of the pressure provision unit (DV). On the other hand, in the case of an infeed switching valve (FV) which is blocked for example by a dirt particle and no longer seals, the bypass valve (BP1), the switching valves SV3 and SV4 in the second brake circuit (BK2) and the central outlet valve (ZAV) can be closed, whereby the disruption of the pedal characteristic in the single master cylinder that is possible in principle owing to the leak of the infeed switching valve (FV) can be prevented, and sufficient brake pressure can still be built up in the first brake circuit (BK1) by means of the pressure provision unit (DV). In the event that it is not possible for the leak to be localized in the ZAV or FV, the same procedure can be used as in the case of a leak in the FV. Furthermore, if such a leakage flow is small, it can, as mentioned above, be compensated by means of the delivery of volume by the pressure provision unit (DV).

If the central outlet valve (ZAV) fails in the sense that it can no longer be opened, brake pressure can be reduced by opening of the infeed switching valve (FV) by means of the single master cylinder and the reservoir (VB). In the case of an alternatively used double master cylinder, the further pressure chamber of which is, as in FIG. 5a and FIG. 5b, connected via a further infeed switching valve (FV2) to the hydraulic control unit, both infeed switching valves (FV, FV2) can be opened for the pressure reduction $P_{reduction}$.

If one (for example SV3) of the switching valves (SV3, SV4) in the second brake circuit fails in the sense that it can no longer be closed, for example owing to a dirt particle, the bypass valve (BP1) can be closed, and sufficient braking force, in particular for level two autonomous driving, can still be built up in the first brake circuit (BK1) by means of the pressure provision unit (DV). What can be particularly advantageous in the event of failure of one of the two brake circuits (BK1, BK2) is the so-called diagonal distribution of the braking force to the four wheels of the vehicle, which, in relation to the distribution of the brake circuits (BK1, BK2) between the front and rear axles of the vehicle, can lead to a greater braking action (for example approximately 50% in the case of the diagonal distribution compared to approximately 30% in the case of front/rear axle distribution, if the front drive circuit fails). Diagonal distribution of the braking force means that a front wheel brake on one side of the vehicle and the rear wheel brake on the other side of the vehicle are assigned to a brake circuit. The wheel brakes of the other diagonals are correspondingly assigned to the second brake circuit.

If one (for example SV1) of the switching valves (SV1, SV2) in the first brake circuit fails in the sense that it can no longer be closed, for example owing to a dirt particle, the bypass valve (BP1) can be closed and the infeed switching valve (FV) can be opened, such that sufficient brake pressure can still be built up in the second brake circuit (BK2) by foot-imparted actuation of the brake pedal (1). If present, the travel simulator isolation valve (14) can additionally be closed, whereby, for example, approximately 40% pedal travel can be saved.

If the infeed switching valve (FV) fails in the sense that it can no longer be closed, for example owing to a dirt particle, the second brake circuit can be decoupled by closure of the switching valves SV3 and SV4, of the central outlet valve (ZAV) and of the bypass valve (BP1). Since disruption of the pedal travel characteristic in the single master cylinder can be prevented in this way, sufficient brake pressure can furthermore still be built up in the first brake circuit (BK1) by means of the pressure provision unit (DV). In the event of emergency braking, the braking force in the wheel brakes (RB1, RB2, RB3, RB4) can furthermore be increased further, by foot-imparted actuation of the brake pedal (1), after opening of the switching valves (SV3, SV4) in the second brake circuit (BK2). If the leakage flow in the infeed switching valve (FV) is small and blocking of one of the wheel brakes (RB1, RB2, RB3, RB4) occurs during the emergency braking, ABS control can be performed by means of the central outlet valve (ZAV) and the pressure provision unit (DV).

If a pressure sensor (for example DG) in one of the brake circuits (BK1, BK2) fails, a further pressure sensor (for example DG2) in one of the brake circuits (BK1, BK2) may be used if present. If there is only one pressure sensor (DG) in the brake system, the pressure in the brake circuits (BK1, BK2) can also be set by closed-loop control by means of the electrical current in the motor of the pressure provision unit (DV) in accordance with predetermined current-pressure relationships stored in the ECU (for example characteristic maps), wherein these current-pressure relationships may include dependencies on various boundary conditions, for example pressure build-up $P_{build-up}$ or pressure reduction $P_{reduction}$, solenoid valve positions, temperature, etc.

If the primary seal (D2) in a pressure chamber of the master cylinder fails, that is to say if the primary seal (D2) is leaking, a leakage of the brake fluid in the master cylinder is possible, which can uncontrollably influence (in this case: increase) the pedal travel and, by way of "brake-by-wire", can give rise to excessive brake pressure and thus undesirably intense braking operations. In the following, the master cylinder shall be assumed to be a single master cylinder, wherein the use of a tandem master cylinder is likewise possible. To avoid a possible total failure of the master cylinder, a connection of the single master cylinder to the reservoir (VB) may be implemented, such as in FIG. 1a, by means of a parallel connection of a check valve (RV1), which closes toward the reservoir, and a throttle (Dr1). In the case of a leaking primary seal (D2) and a leak-tight secondary seal (D1), the leakage flow is blocked by the check valve (RV1) and throttled by the throttle (Dr1) such that only an insignificantly small piston or pedal movement results, which only insignificantly disrupts the "brake-by-wire" braking operation. The throttle (Da) may for example be designed such that the pedal movement caused by the leak is approximately 0.2 mm/s. With an average braking time of approximately 3 s to decelerate a vehicle at 100 km/h with 1 g, disruption of the pedal travel by 0.6 mm can thus occur, which is small and negligible in relation to the entire pedal stroke. The check valve (RV1) allows rapid filling of the brake system with brake fluid and rapid ventilation via opened vent screws on the wheel cylinders (RZ1, RZ2, RZ3, RZ4). The throttle (Da) also allows volume compensation in the event of temperature changes.

A critical double fault consisting of a leaking primary seal (D2) and the additional dormant individual fault of a leaking secondary seal (D1), in the case of which the leak can no longer be throttled by the throttle (Dr1), can be averted by means of further redundant primary and/or secondary seals (not shown). According to the invention, as in FIG. 1a, the leak-tightness of the secondary seal (D1) can be monitored at regular intervals (for example upon every parking stop) by diagnostics. In the absence of a travel simulator (WS) or in the case of a travel simulator (WS) that is switchably connected by means of the travel simulator isolation valve (14), the leak can in this case be uniquely assigned to the secondary seal (D1). The procedure in one of these cases may for example be implemented as follows: If, by means of corresponding valve switching after the vehicle has been shut down, the residual pressure in the brake system passes via the open infeed switching valve (FV) into the single master cylinder, it is possible, during a time of for example 10 seconds, for the leak-tightness of the entire brake system to be checked on the basis of the pressure change detected by the pressure sensor (DG), wherein an identified pressure drop can indicate a leak. If such a leak is identified, the single master cylinder can be charged with a constant pressure of for example 20 bar for a certain period of time by means of the pressure provision unit (DV) after closure of the switching valves (SV1, SV2, SV3, SV4) and, if present, of the travel simulator isolation valve (14). Here, the delivered quantity can be ascertained for example by means of the change in angle, detected by the rotor position sensor, in the motor of the pressure provision unit (DV). If this is greater than the known delivery rate of the throttle (Dr1) at for example 20 bar, the secondary seal (D1) can be assessed as leaking. A double fault with a leaking primary (D2) and secondary seal (D1) can thus occur only in the unlikely event that both seals (D1, D2) fail at the same time during travel. In the case of a travel simulator (WS) without a travel simulator isolation valve (14), it may under some circumstances be the case, analogously to the diagnosis just described, that a detected leak cannot be uniquely assigned to the secondary seal (D1) of the single master cylinder, because the leak may also be caused by a leaking travel simulator seal (D3) of the travel simulator (WS), which, owing to the throttling by the leaking travel simulator seal (D3) as well as by means of a further throttle (Dr3) between the travel simulator seal (D3) and a further redundant seal (D3r) of the travel simulator (WS), can likewise lead to a leakage flow via a connection (not shown) into the reservoir (VB). In this case, in the event of a leak in D1 or D3, different leakage flows through Dr1 and/or Dr3 may arise to a certain extent owing to different configurations of the hydraulic resistances for the throttles Dr1 and Dr3, whereby the diagnosis just described can then localize the leak at D1 or D3. On the other hand, even without localization of the leak at D1 or D3, a dormant fault in D1 or D3 can be avoided by replacing both seals (D1, D3) at the same time, and the safety of the brake system can be ensured. An additional fault of the redundant primary seal (D3r) can be classified as an unlikely double fault.

The reservoir (VB) may have two mutually redundant fluid chambers. The reservoir (VB) has, in at least one fluid chamber, a float (8) with a sensor target (7), which, together with a fill level sensor element (6) on the PCB (5) of the electronic control unit (ECU) attached to the reservoir (VB), can measure the fill level of the brake fluid in the reservoir (VB) in virtually continuously variable fashion. In this way, it is likewise possible for small leaks to be detected redundantly in the brake circuit, for example leaks of D1 or of one of the wheel cylinders RZ1-RZ4. The integration of the fill level sensor element (6) into the electronic control unit (ECU) can reduce costs.

Figure 1B:
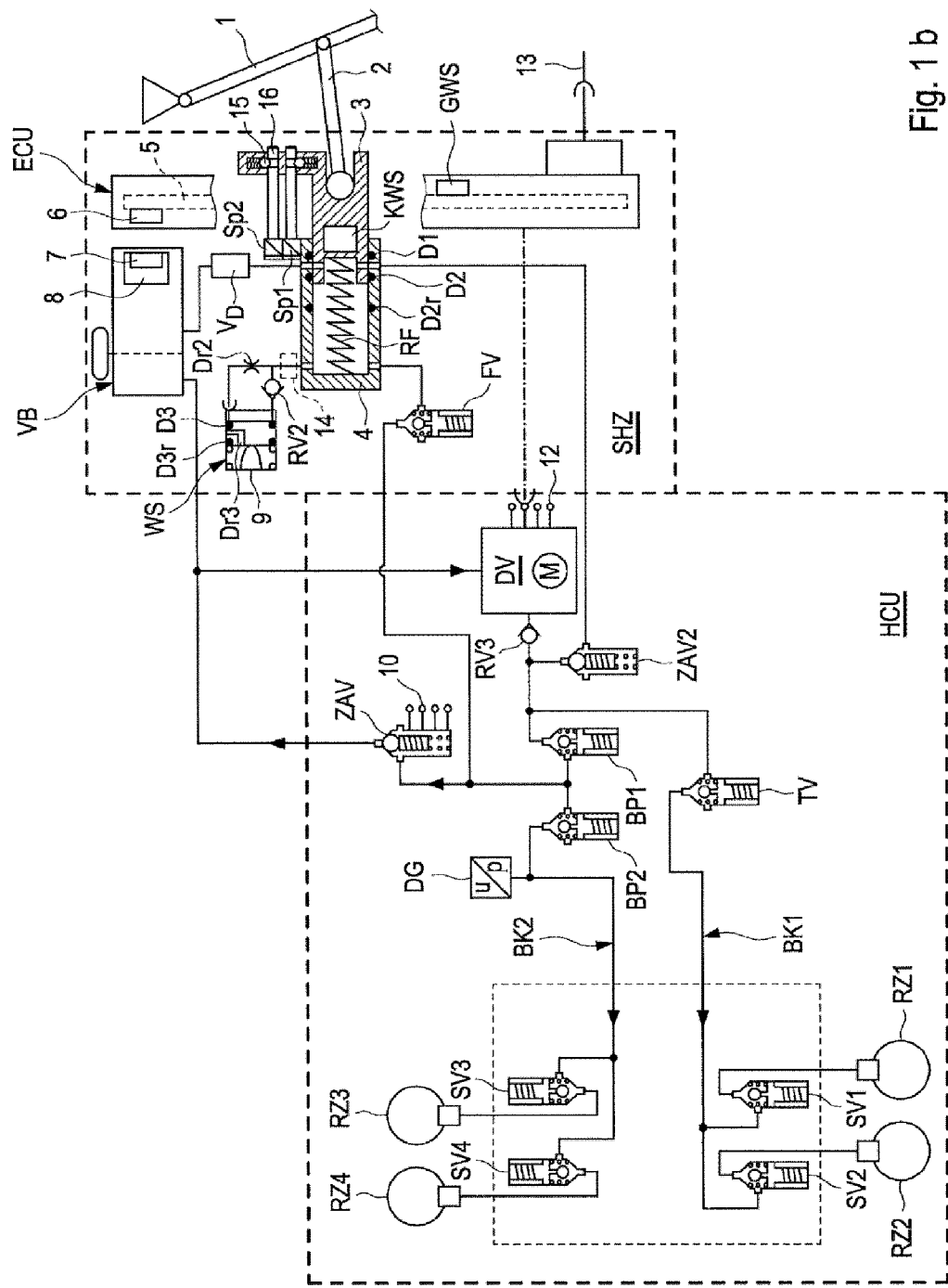
FIG. 1b shows a second possible embodiment of the brake system according to the invention in an expanded valve arrangement in the HCU with two bypass valves (BP1 and BP2), two (central) outlet valves (ZAV1, ZAV2), and an isolation valve (TV).

FIG. 1b shows a further embodiment of a brake system, which in relation to FIG. 1a has a further bypass valve (BP2), an isolation valve (TV) and a further (central) outlet valve (ZAV2). In this way, the safety in the brake system can be increased, in particular with regard to double faults.

The further bypass valve (BP2) may be incorporated into the second brake circuit (BK2) such that the second brake circuit (BK2) with the wheel cylinders RZ3 and RZ4 can be decoupled from the rest of the brake system in the event of a fault in the second brake circuit (BK2). As shown in FIG. 1b, it is for example possible for the second bypass valve (BP2) to be incorporated into the hydraulic line between the first bypass valve (BP1) and the pressure sensor (DG) in the second brake circuit (BK2), wherein the central outlet valve (ZAV) may then be connected via the second bypass valve (BP2) to the second brake circuit (BK2). The combination of the two bypass valves (BP1, BP2) can be referred to as a safety gate (SIG), possibly also in a possible expansion by way of the isolation valve (TV).

The isolation valve (TV) may be incorporated into the first brake circuit (BK1) such that the first brake circuit (BK1) with the wheel cylinders RZ1 and RZ2 can be decoupled from the rest of the brake system in the event of a fault (for example double fault RZ and SV) in the first brake circuit (BK1). As shown in FIG. 1b, it is for example possible for the isolation valve (TV) to be incorporated into the hydraulic line between the pressure provision unit (DV) or, if present, the check valve (RV3) or a solenoid valve on the pressure provision unit (DV) and the switching valves (SV1, SV2) of the first brake circuit (BK1). Furthermore, a redundant pressure sensor (DG2) (not shown) may be coupled to the first brake circuit (BK1).

The further central outlet valve (ZAV2) may be incorporated into the brake system such that pressure in the brake system can be reduced redundantly in relation to the central outlet valve (ZAV). As illustrated in FIG. 1b, said further central outlet valve may for example be connected to the hydraulic line between the isolation valve (TV) and the pressure provision unit (DV) or, if present, the check valve (RV3) or a solenoid valve on the pressure provision unit (DV). For safety reasons, central outlet valves ZAV and ZAV2 should be connected to separate parts of the reservoir (VB). Central outlet valve ZAV2 may also, for example as illustrated in FIG. 1b, be connected to the reservoir (VB) via a further opening in the master cylinder and an annular breather opening in the piston (3).

The second bypass valve (BP2) and the isolation valve (TV) may be designed as solenoid valves which are open when electrically deenergized, whereas the further central outlet valve (ZAV2) may be designed as a solenoid valve which is closed when electrically deenergized. The second bypass valve (BP2) and the isolation valve (TV) may furthermore each be connected by way of their output side to the second brake circuit (BK2) and to the first brake circuit (BK1) respectively such that they can be opened by the residual pressure in the brake circuits (BK1, BK2) in the event of failure of the valve control (for example in a situation without electrical energization). It is thus possible, as is the case in the brake system in FIG. 1a, that braking operations can be performed by way of the foot-imparted actuation of the brake pedal (1) even in a situation without electrical energization.

If one (for example ZAV) of the two (central) outlet valves (ZAV, ZAV2) fails in the sense that it can no longer be opened, the pressure reduction $P_{reduction}$ can be performed by means of the other central outlet valve (ZAV2). By contrast to the situation in FIG. 1a, the infeed switching valve (FV) does not have to be opened here, whereby the "brake-by-wire" functionality can be maintained and, in particular, a disruption of the pedal travel characteristic and thus an influencing of the pedal movement can be avoided.

In one embodiment according to the invention, the further central outlet valve (ZAV2) furthermore has the advantage that the pressure reduction $P_{reduction}$ can be set by closed-loop control independently in in each case two wheel cylinders (RZ1, RZ2 and RZ3, RZ4 respectively) per brake circuit (BK1, BK2) during a driving dynamics intervention (for example ABS).

By means of the second bypass valve (BP2), safety can be increased if the infeed switching valve (FV) can no longer be closed (for example owing to a dirt particle or a fault in the electrical connection). In such a case, the single master cylinder can be decoupled from the brake system by means of the closure of both bypass valves (BP1, BP2), and sufficient brake pressure can still be built up in the first brake circuit (BK1) by means of the pressure provision unit (DV). The pressure reduction $P_{reduction}$ can in this case be performed for example by means of the further (central) outlet valve ZAV2. In the event of emergency braking, the braking force can furthermore be increased further, by foot-imparted actuation of the brake pedal (1) in the second brake circuit (BK2), after the opening of the second bypass valve (BP2). In this way, it is for example possible to achieve a braking action of approximately 75% of the full normal braking action. If the leakage owing to the infeed switching valve (FV) which is no longer closing is small, it is for example still possible for a pressure reduction $P_{reduction}$ (and pressure build-up $P_{build-up}$) for an ABS intervention to be performed by means of the switching valves (SV3, SV4) and one of the central outlet valves (ZAV).

In addition to the primary seal (D2) and the secondary seal (D1), the single master cylinder may have further redundant primary and/or secondary seals, in particular a redundant primary seal (D2r) illustrated in FIG. 1b.

Figure 2:
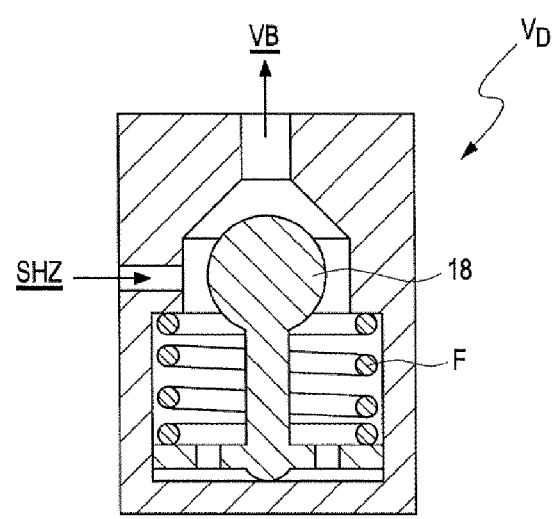
FIG. 2 shows the construction of a diagnostic valve ($V_D$).

The breather opening in the single master cylinder between the primary seal (D2) and the secondary seal (D1) may be connected via a so-called diagnostic valve ($V_D$), which is illustrated in FIG. 2 and will be described further below, to the reservoir (VB). In the event of a fault in which the pressure reduction $P_{reduction}$ in the brake circuits (BK1, BK2) cannot be performed by means of the (central) outlet valves (ZAV and, if present, ZAV2), pressure can be reduced by dissipation via the open infeed switching valve (FV) and the single master cylinder into the reservoir (VB). Whereas the pressure reduction $P_{reduction}$ in FIG. 1a can be performed only by way of very small volume flows owing to the parallel connection of a throttle (Dr1) and a check valve (RV1) in the hydraulic connection of the single master cylinder to the reservoir, relatively large volume flows can flow back into the reservoir (VB) in the case of the pressure reduction $P_{reduction}$ in FIG. 1b, provided that these volume flows are smaller than a closing volume flow predetermined by the configuration of $V_D$. By means of suitable control, for example by means of pulse width modulation (PWM), of involved solenoid valves (for example SV1, SV2, SV3, SV4, BP1, BP2, FV), the pressure reduction $P_{reduction}$ can be performed such that the limit volume flow of the diagnostic valve ($V_D$) is not exceeded and the diagnostic valve ($V_D$) thus remains open during the pressure reduction. On the other hand, the diagnosis described in FIG. 1a for the monitoring of the sealing of the master cylinder, that is to say of the leak-tightness of the secondary seal (D1), by means of the diagnostic valve ($V_D$) can be performed in a similar manner, wherein volume flows above the closing volume flow of $V_D$ are intentionally conveyed by means of the pressure provision unit (DV) into the master cylinder because, when the diagnostic valve ($V_D$) is closed, the leak-tightness can be determined by way of a pressure profile detected by means of the pressure sensor (DG). To increase safety in FIG. 1a with only one central outlet valve (ZAV), the hydraulic connection between the single master cylinder and the reservoir (VB) may also be replaced by the connection to the diagnostic valve ($V_D$) from FIG. 1b.

To safeguard the primary seal (D2) in the master cylinder, which, by contrast to FIG. 1a, is not safeguarded by a throttle-check valve combination (Dr1, RV1), a redundant primary seal (D2r) can be used. The diagnosis of the primary seal can be performed during a braking operation by means of the force-travel sensor (KWS) and the pedal travel sensors (Sp1, Sp2). Alternatively, the diagnosis of the primary seal may be performed by means of the pressure sensor in the single master cylinder and the pedal travel sensors (Sp1, Sp2).

FIG. 2 shows a possible embodiment for a back pressure valve, which may be used as a diagnostic valve ($V_D$) for example in FIG. 1b. The back pressure valve may have two openings, wherein one of the two openings may have a valve seat and preferably an opening cross-section that is larger than the other opening. Furthermore, said back pressure valve can have a plunger with a sealing ball (18), wherein, in the absence of a fluid flow, the plunger may be braced in the valve housing by a spring (F) such that the sealing ball (18) cannot close the valve seat of the preferably larger opening. If, by contrast, a liquid flows via the opening without a valve seat through the opening with a valve seat, a back pressure can be caused above a so-called closing volume flow owing to the predetermined geometry of the openings, valve seat and sealing ball (18), which back pressure presses the sealing ball (18) into the valve seat and thus closes the valve in this direction. If the diagnostic valve ($V_D$) closes at volume flows above the closing volume flow, it can open again in the same flow direction if a further opening volume flow predetermined by the configuration of $V_D$ is undershot. In the other direction of flow, brake fluid can be conveyed through the valve without a closing action.

Figure 3:
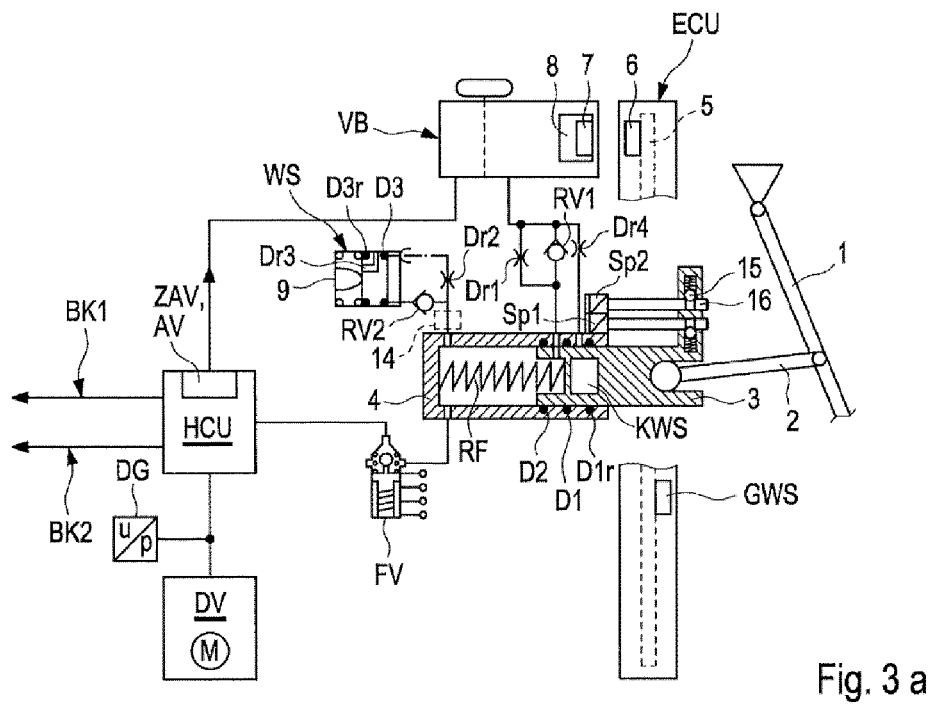
FIG. 3a shows an embodiment according to the invention for the connection between the single master cylinder and the reservoir (VB) with two throttles (Dr1, Dr4) and with a check valve (RV1) and also with a redundant secondary seal (D1r).
FIG. 3b shows an embodiment according to the invention for the connection between the single master cylinder and the reservoir (VB) with diagnostic valve ($V_D$) and with a redundant primary seal (D2r).
FIG. 3c shows an embodiment according to the invention for the connection between the single master cylinder and the reservoir (VB) with a reservoir shut-off valve (17), with a throttle (Dr4) and with in each case one redundant primary (D2r) and secondary seal (D1r).
FIG. 3d shows an exemplary pedal force-travel characteristic for a single master cylinder with a further resetting spring (RF2) and with a travel simulator (WS).
Figure 3:
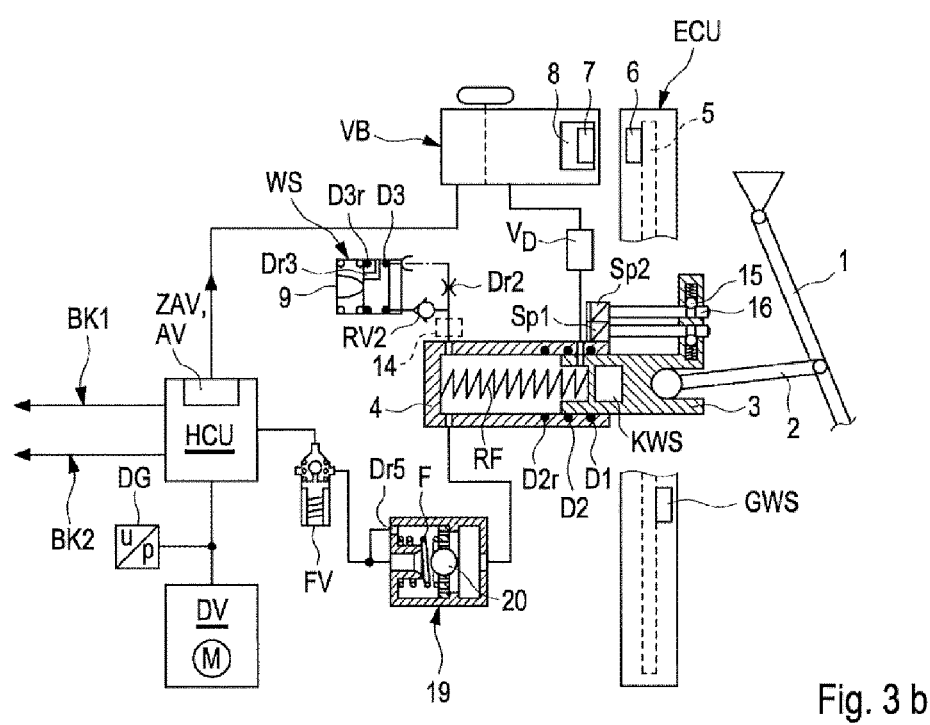
Figure 3:
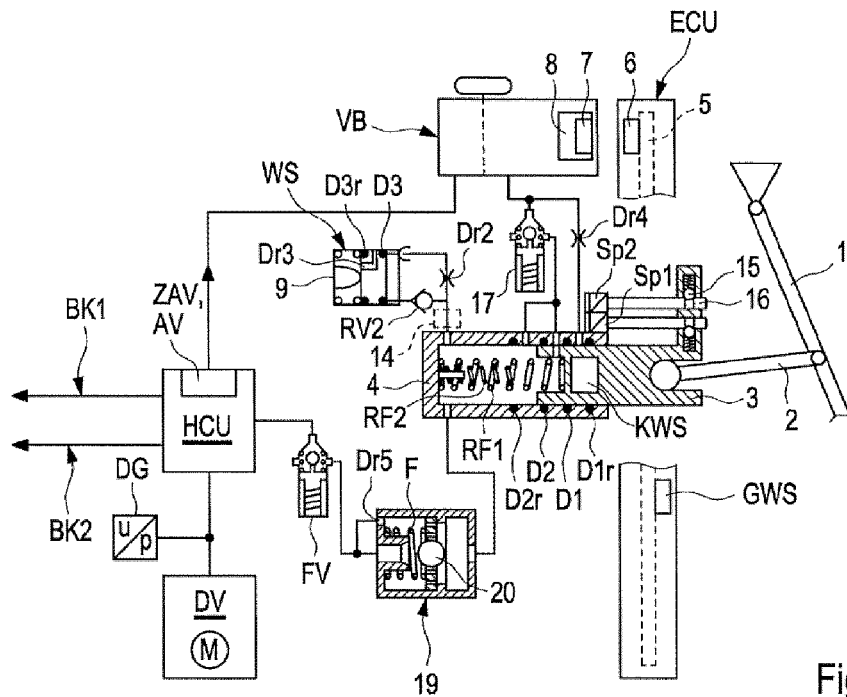
Figure 3:
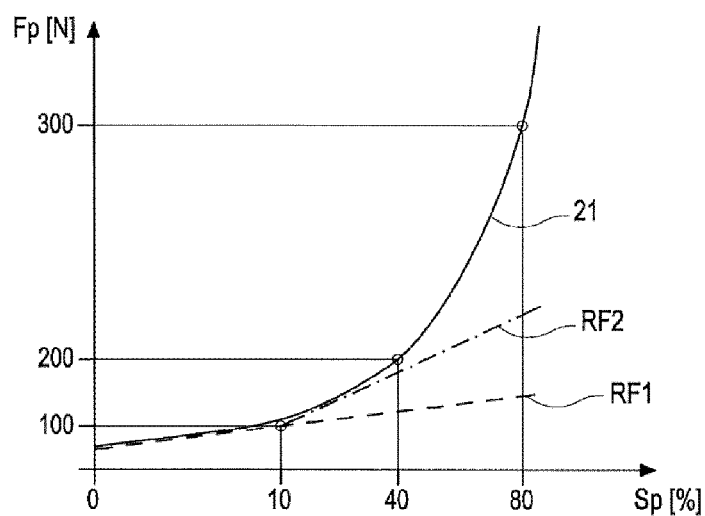

FIGS. 3a-c show various embodiments according to the invention for a so-called fail-safe single master cylinder unit (SHZ) in a brake system according to the invention, wherein the safeguards described below may likewise be used in a tandem master cylinder unit (THZ). The respective single master cylinder units (SHZ) described in conjunction with FIGS. 3a-c can be used in the systems according to FIGS. 1a-b, FIGS. 4a-c and FIGS. 5a-b.

FIG. 3a shows an embodiment of a single master cylinder unit (SHZ) which, in relation to that in FIG. 1a, has a further redundant secondary seal (D1r) in order to safeguard the sealing of the master cylinder to the outside. The master cylinder furthermore has a further opening between the secondary seal (D1) and the redundant secondary seal (D1r), which further opening is connected to the reservoir (VB) via a throttle (Dr4). The leak-tightness of the secondary seal (D1) can also be diagnosed by means of this connection.

FIG. 3b shows an embodiment of a single master cylinder unit (SHZ) which, with regard to the connection of the master cylinder to the reservoir (VB), corresponds to that in FIG. 1b.

FIG. 3c shows an embodiment of a single master cylinder unit (SHZ) which has a redundant primary seal (D2r) and optionally a redundant secondary seal (D1r). In addition to the breather opening between the primary seal (D2) and the secondary seal (D1), the master cylinder may have a further opening between the primary seal (D2) and the redundant primary seal (D2r), wherein the two openings may be connected by means of a hydraulic line, which in turn is connected via a switchable reservoir shut-off valve (17) to the reservoir (VB). The reservoir shut-off valve (17) can be regarded as a redundancy for the pressure chamber sealing, since it can be closed in the event of a leak of one of the primary seals (D2, D2r). The reservoir shut-off valve (17) in FIG. 3c may be designed as a solenoid valve which is open when electrically deenergized. In this way, the brake system can be filled and ventilated even in the electrically deenergized state.

Similarly to the case of the throttle-check valve combination from FIG. 1a and FIG. 3a, it is furthermore possible for diagnosis of the sealing of the master cylinder to the outside, that is to say of the secondary seal (D1), to be performed in a standstill state, and with the reservoir shut-off valve (17) closed, by means of the residual pressure or the pressure provision unit (DV). In the case of a further redundant secondary seal (D1r) and a further opening of the master cylinder between the secondary seal (D1) and the redundant secondary seal (D1r), which is connected via a throttle (Dr4) to the reservoir (VB), the leakage flow through Dr4 can be taken into consideration here in the diagnosis.

Further openings may be provided between further redundant primary seals, which further openings may likewise be connected via the reservoir shut-off valve (17) to the reservoir (VB).

Fail-safety in general means here that an individual failure of an element of the brake system is safeguarded by redundancy, and the failure of the element of the brake system or the failure of the redundancy can be determined by diagnostics. An individual failure (or individual fault) is a failure (or fault) of only one element of the brake system. Double failures (or double faults) or multiple failures (or multiple faults), on the other hand, refer to failures (or faults) of two or more elements of the brake system. In general, double or multiple faults can be accepted if their occurrence is very unlikely. However, double faults which can lead to total failure of the brake system should be avoided in a fail-safe system. Double faults in a fail-safe system can be avoided if so-called dormant individual faults, which each lead, with a further individual fault, to double faults, are safeguarded or identified by redundancy with additional diagnosis.

A single master cylinder is fail-safe if the pressure chamber seal of the master cylinder is fail-safe. In the normal situation, that is to say in the absence of faults, the pressure chamber seal of a single master cylinder is realized for example by the primary seal (D2) of the single master cylinder. An individual failure of the seal of the single master cylinder pressure chamber, for example caused by a leaking primary seal (D2), can lead to a total failure of the brake system. The desired fail safety therefore requires at least one redundancy for the pressure chamber seal and at least one diagnosis of the pressure chamber seal or of the redundancy of the pressure chamber seal. A fail-safe master cylinder can be used in levels three to four in accordance with the SAE J3016 standard.

The required at least one redundancy for the pressure chamber sealing may for example be realized,
as in FIG. 1a and FIG. 3a, by means of the above-described throttling through the combination of a throttle (Dr1) and a check valve (RV1) in the connection of the master cylinder to the reservoir (VB), in this case with a negligible change in pedal travel,
or, as in FIG. 1b, FIG. 3b and FIG. 3c, by means of a second redundant primary seal (D2r),
or, as in FIG. 3c, by closure of a switchable reservoir shut-off valve (17) via which the breather opening of the single master cylinder is connected to the reservoir (VB).

Whereas (apart from the at least one diagnosis that is still required) one redundancy is sufficient for the fail safety of the master cylinder, redundancies can be combined in an expedient manner to increase safety. For example, independently of a redundancy (combination Dr1/RV1 or reservoir shut-off valve 17) in the connection of the master cylinder to the reservoir (VB), further redundant primary seals (for example D2r) may be used. In principle, a combination of the combination Dr1/RV1 and reservoir shut-off valve 17 is also conceivable.

The at least one diagnosis of the pressure chamber seal or of the redundancy of the pressure chamber seal may be implemented as a diagnosis of the pressure chamber seal, for example
as in FIG. 1b, FIG. 3b and FIG. 3c, wherein, by means of a force-travel sensor (KWS) in the piston of the master cylinder or by means of a pressure sensor in the pressure chamber of the master cylinder, which measures the pedal force ($F_p$) or the pressure in the pressure chamber respectively, the leak-tightness of the primary seal (D2) is monitored during braking operation in that, during foot-imparted actuation, the pedal force ($F_p$) or the pressure respectively is analyzed in a manner dependent on the movement of the piston (3), which is detected by means of the pedal travel sensors (Sp1, Sp2);

or implemented as a diagnosis of the redundancy of the pressure chamber seal, for example
as in FIG. 1a and FIG. 3a, wherein the throttle-check valve combination (Dr3, RV1) can be diagnosed as described above by way of the residual pressure in the brake system or by means of the pressure provision unit (DV) in the standstill state of the vehicle, preferably when parked, by virtue of the return to the reservoir (VB), which can be ascertained for example by way of the delivery volume of the pressure provision unit (DV) and/or by way of the change in fill level in the reservoir (VB), being compared with the expectable blocking by the check valve (RV1) and the throttling by the throttle (Dr1);
or as in FIG. 3c, wherein, by means of the pressure provision unit (DV) and corresponding valve positions (for example closed SV1, SV2, SV3, SV4, ZAV, 14 and open BP1, FV), the leak-tightness of the switchable reservoir shut-off valve (17) can be checked, possibly taking into consideration the fill level sensor in the reservoir (VB).

In relation to diagnoses performed in the standstill state of the vehicle, preferably when parked, safety can be increased by means of diagnoses performed during a braking operation and thus in particular several times during travel. Further redundant primary seals (for example D2r) in the master cylinder may likewise be diagnosed by means of the force-travel sensor (KWS) and/or the pressure sensor in the pressure chamber of the master cylinder.

If the brake system is coupled to a travel simulator (WS), as is conventional in "brake-by-wire" systems, the travel simulator (WS) should also be of fail-safe design. A travel simulator (WS) is fail-safe if the pressure chamber seal of the travel simulator (WS) is fail-safe. In the normal situation, that is to say in the absence of faults, the pressure chamber seal of the travel simulator (WS) is realized for example by the travel simulator seal (D3) of the travel simulator (WS). An individual failure of the seal of the travel simulator pressure chamber, for example caused by a leaking travel simulator seal (D3), can likewise lead to a total failure of the brake system. The desired fail safety therefore requires at least one redundancy for the pressure chamber seal and at least one diagnosis of the pressure chamber seal or of the redundancy of the pressure chamber seal.

The required at least one redundancy for the pressure chamber seal may for example be realized
- by means of a second redundant travel simulator seal (D3r);
- or, as in FIG. 1a, FIG. 1b, FIG. 3a, FIG. 3b and FIG. 3c, by means of a second redundant travel simulator seal (D3r) and the above-described throttling of the leak by means of the throttle (Dr3) between the travel simulator seal (D3) and the redundant travel simulator seal (D3r), in this case with a slow change in pedal travel.

The at least one diagnosis of the pressure chamber seal of the travel simulator or of the redundancy of the pressure chamber seal may be implemented as a diagnosis of the pressure chamber seal, for example
- as in FIG. 1b, FIG. 3b and FIG. 3c, wherein, by means of a force-travel sensor (KWS) in the piston of the master cylinder or by means of a pressure sensor in the pressure chamber of the master cylinder, which measures the pedal force ($F_p$) or the pressure respectively, the leak-tightness of the travel simulator seal (D3) (and of the primary seal (D2)) is monitored during braking operation in that, during foot-imparted actuation, the pedal force ($F_p$) or the pressure respectively is analyzed in a manner dependent on the movement of the piston (3), which is detected by means of the pedal travel sensors (Sp1, Sp2);
- or as in FIG. 1a, FIG. 1b, FIG. 3a, FIG. 3b and FIG. 3c, wherein the leak-tightness of the travel simulator seal (D3) is monitored, with corresponding valve positions, by way of the residual pressure in the brake system or by means of the pressure provision unit (DV) in the standstill state of the vehicle, preferably when parked, by virtue of the return to the reservoir (VB), which can be ascertained for example by way of the delivery volume of the pressure provision unit (DV) and/or by way of the change in fill level in the reservoir (VB), being compared with the expectable blocking by the check valve (RV1) and the throttling by the throttles (Dr1, Dr2), possibly taking into consideration the fill level sensor in the reservoir (VB);
- or as in FIG. 3c, wherein, by means of the pressure provision unit (DV) and corresponding valve positions (for example closed SV1, SV2, SV3, SV4, ZAV, 17 and open BP1, FV, 14), the leak-tightness of the travel simulator seal (D3) can be checked, possibly taking into consideration the fill level sensor in the reservoir (VB).

To increase safety, diagnoses may be combined in an expedient manner.

Owing to the hydraulic coupling of the pressure chambers of the master cylinder and travel simulator (WS), a diagnosed leak in the coupled pressure chamber cannot generally be localized, because this may be caused for example both by a leaking primary seal (D2) of the master cylinder and by a leaking travel simulator seal (D3). This is sufficient for the fail safety insofar as diagnosed leak-tightness in the coupled pressure chamber implies the leak-tightness of both seals (D2, D3). If a travel simulator isolation valve (14) is present, any leak in the travel simulator (WS) or master cylinder can be localized.

The safety demands on the seal of the single master cylinder to the outside, which in the normal situation is performed for example by means of a secondary seal (D1), may be less strict than those on the seal of the master cylinder pressure chamber, because on the one hand the secondary seal (D1) is not subjected to high pressures, and on the other hand the consequences of the fault are less critical. By contrast to the stricter requirement for fail safety, safety is ensured if at least one redundancy of the element and/or a failure of the element can be diagnosed.

An individual failure of the seal of the single master cylinder to the outside, for example a leaking secondary seal (D1), which can lead to a loss of brake fluid, can for example be safeguarded by a redundancy
- as in FIG. 3a and FIG. 3c, by means of a second redundant secondary seal (D1r),
- or as in FIG. 3a and FIG. 3c, by throttling by means of a further throttle (Dr4), via which a further opening in the single master cylinder between the secondary seal (D1) and the redundant secondary seal (D1r) is connected to the reservoir (VB), in this case with slowed leakage, which in turn, in the standstill state of the vehicle, can be monitored for example by way of a change in the brake fluid level in the reservoir (VB).

Furthermore, during non-braking operation, wherein non-braking operation refers to operation in which no braking process is taking place, and in particular refers to the standstill state of the vehicle (for example when parked), the leak-tightness of the secondary seal (D1) can be determined or diagnosed in that,
- as in FIG. 1a and FIG. 3a and already described above, volume is conveyed via the master cylinder into the reservoir (VB) in the first step by means of the residual pressure in the brake circuits (BK1, BK2) and in the second step by means of the pressure provision unit (DV), and, in the presence of a pressure set by closed-loop control, the delivery volume of the pressure provision unit (DV) is compared with the normal and expectable throttle flow,
- or as in FIG. 1b and FIG. 3b and already described above, volume is conveyed with fluid flows above the closing volume flow of the diagnostic valve ($V_D$) via the master cylinder into the reservoir (VB) by means of the pressure provision unit (DV), and the pressure profile detected by means of the pressure sensor (DG) is analyzed,
- or as in FIG. 3c, volume is conveyed with fluid flows via the master cylinder into the reservoir (VB) by means of the pressure provision unit (DV), wherein the reservoir shut-off valve (17) is closed and, in the presence of a pressure set by closed-loop control, the delivery volume of the pressure provision unit (DV) is compared with the normal and expectable throttle flow through the throttle (Dr4).

To increase safety, redundancies and diagnoses may be combined in a variety of expedient ways. In the diagnoses, the fill level sensor (6) in the reservoir (VB) may likewise or additionally be used for leak identification.

The safety demands on the seal of the infeed switching valve (FV) in the closed state, that is to say on the seal of the infeed switching valve (FV), which in the normal situation is performed for example by means of a seal in the valve seat, may likewise be less strict than those on the seal of the master cylinder pressure chamber, because the consequences of faults are less critical. By contrast to the stricter requirement for fail safety, safety is ensured if at least one redundancy of the element and/or a failure of the element can be diagnosed.

An individual failure of the seal of the infeed switching valve (FV), which, caused for example by a dirt particle, impairs the "brake-by-wire" functionality and can disrupt the force-travel characteristic of the brake pedal system, for example by means of a redundancy by means of a further solenoid valve (not shown in the figures) connected in series, or, as in FIG. 1a, FIG. 1b, FIG. 3a, FIG. 3b, FIG. 3c and already described, by deactivation of the second brake circuit (BK2) by closure of the solenoid valves ZAV, SV3, SV4, BP1 or possibly ZAV, BP1, BP2, wherein sufficient braking force is still available by means of the first brake circuit (BK1) (for example 50% braking action still remains depending on the wheel distribution).

Furthermore, as in FIG. 1a, FIG. 1b, FIG. 3a, FIG. 3b and FIG. 3c, preferably during non-braking operation, the leak-tightness of the closed infeed switching valve (FV) can be determined by means of the pressure provision unit (DV) and by way of changes in the pedal travel. To increase safety, redundancies and diagnoses may be combined in a variety of expedient ways.

Whereas, in the event that the (central) outlet valves (ZAV, ZAV2) in the hydraulic control unit (HCU) can no longer be opened, the pressure reduction $P_{reduction}$ via the master cylinder in FIG. 1a and FIG. 3a can take place only in a throttled manner (via Dr1), the pressure reduction $P_{reduction}$ in FIG. 1b, FIG. 3b and FIG. 3c can also take place via the master cylinder with less throttling.

The hydraulic connection between the at least one hydraulic output of the master cylinder and the infeed switching valve (FV) can be implemented as in FIG. 3b and FIG. 3c by means of a back pressure valve (19) which is constructed and connected such that, in the presence of excessively high pedal forces (greater than approximately 500 N), it becomes a throttle in the fluid direction from the master cylinder to the hydraulic control unit, for example by virtue of a perforated valve plate (20) within the back pressure valve (19) blocking the main output owing to the back pressure effect but maintaining the second throttle output by way of the arrangement of the throttle point in the valve plate (20).

FIG. 3d shows an exemplary pedal force-travel characteristic (21) of the brake pedal (1) of the single master cylinder unit (SHZ) in FIG. 3c, wherein the pedal travel (Sp) is specified relative to the total pedal travel. The resetting force of the brake pedal (1) is generated by a resetting spring (RF1) in the master cylinder (range up to 10% in FIG. 3d) and a controllable elasticity in the travel simulator (WS) (range proceeding from 40% in FIG. 3d). In order to prevent a collapse of the brake pedal (1) in the event of a faulty seal of the pressure chambers of the master cylinder or of the travel simulator (WS), a further resetting spring (RF2) may be integrated in the master cylinder, which further resetting spring increases the gradient of the pedal force-travel characteristic of the brake pedal (1) for example proceeding from approximately 10% of the pedal travel.

A preferred embodiment of the brake system according to the invention can be derived from FIG. 3b, wherein the diagnostic valve $V_D$ in the connection of the master cylinder to the reservoir (VB) is omitted, that is to say the master cylinder is connected directly to the reservoir (VB) via the breather opening between the primary (D2) and secondary seal (D1). The single master cylinder in this embodiment is fail-safe owing to the redundant primary seal (D2r), the redundant travel simulator seal (D3r) and the force-travel sensor (KWS) according to the definition above. A leak of the secondary seal (D1) can be diagnosed in the standstill state of the vehicle by means of the fill level sensor element (6) in the reservoir (VB) or on the PCB. In addition, the secondary seal (D1) may be checked for leak-tightness during servicing work (for example every two to three years) by charging the reservoir (VB) with compressed air at for example 5 bar with the valves FV, ZAV, and, if present, ZAV2, AV1-4 and travel simulator isolation valve, closed.

Figure 4:
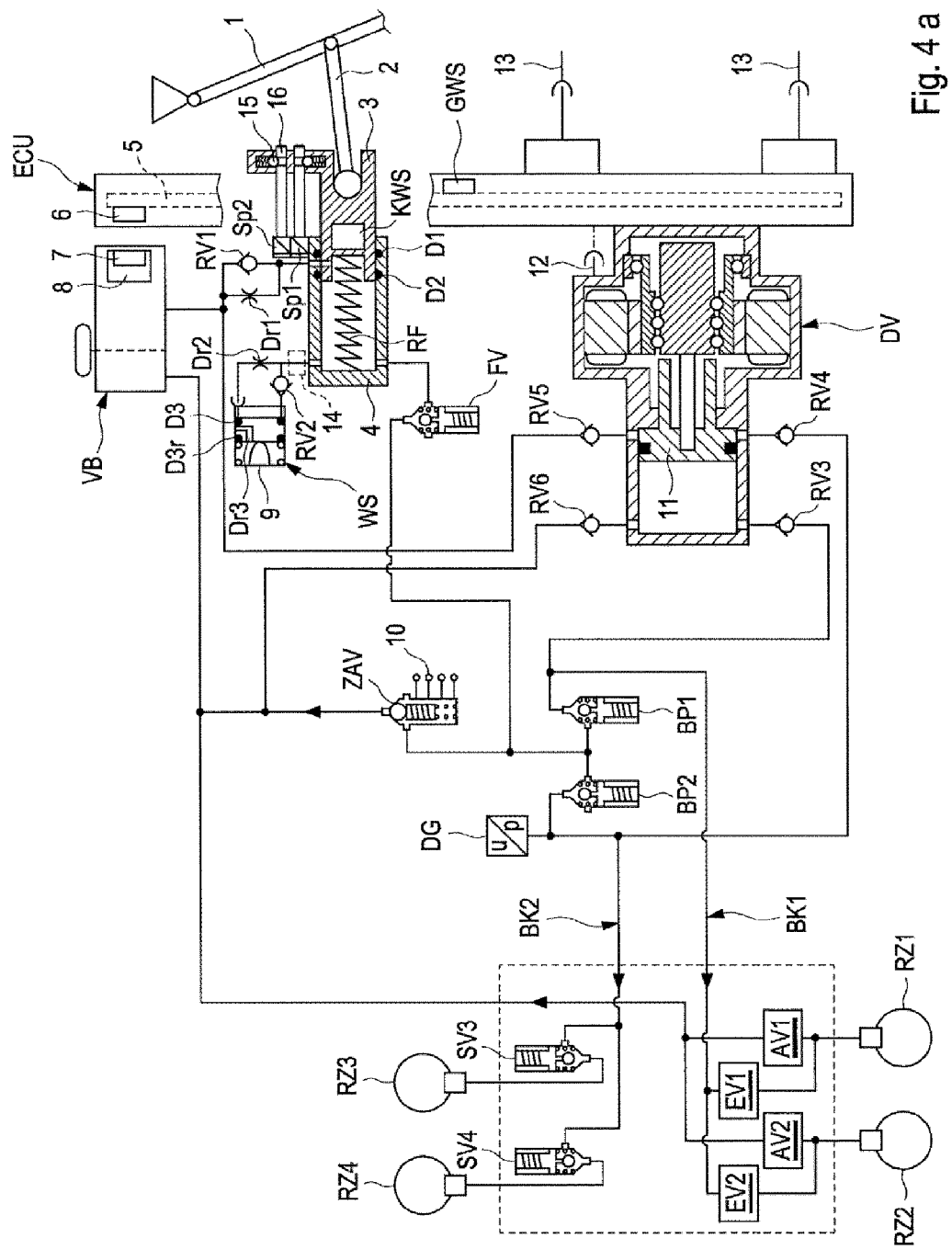
FIG. 4a shows an embodiment according to the invention with a single master cylinder unit (SHZ) and with a two-circuit double-action piston pump with four check valves (RV3, RV4, RV5, RV6).
FIG. 4b shows an embodiment according to the invention with a single master cylinder unit (SHZ) and with a two-circuit double-action piston pump with three check valves (RV4, RV5, RV6) and with a solenoid valve (PD1).
FIG. 4c shows an embodiment with a single master cylinder unit (SHZ) and with a two-circuit double-action piston pump with four solenoid valves (PD1, PD2, PD3, PD4).
Figure 4:
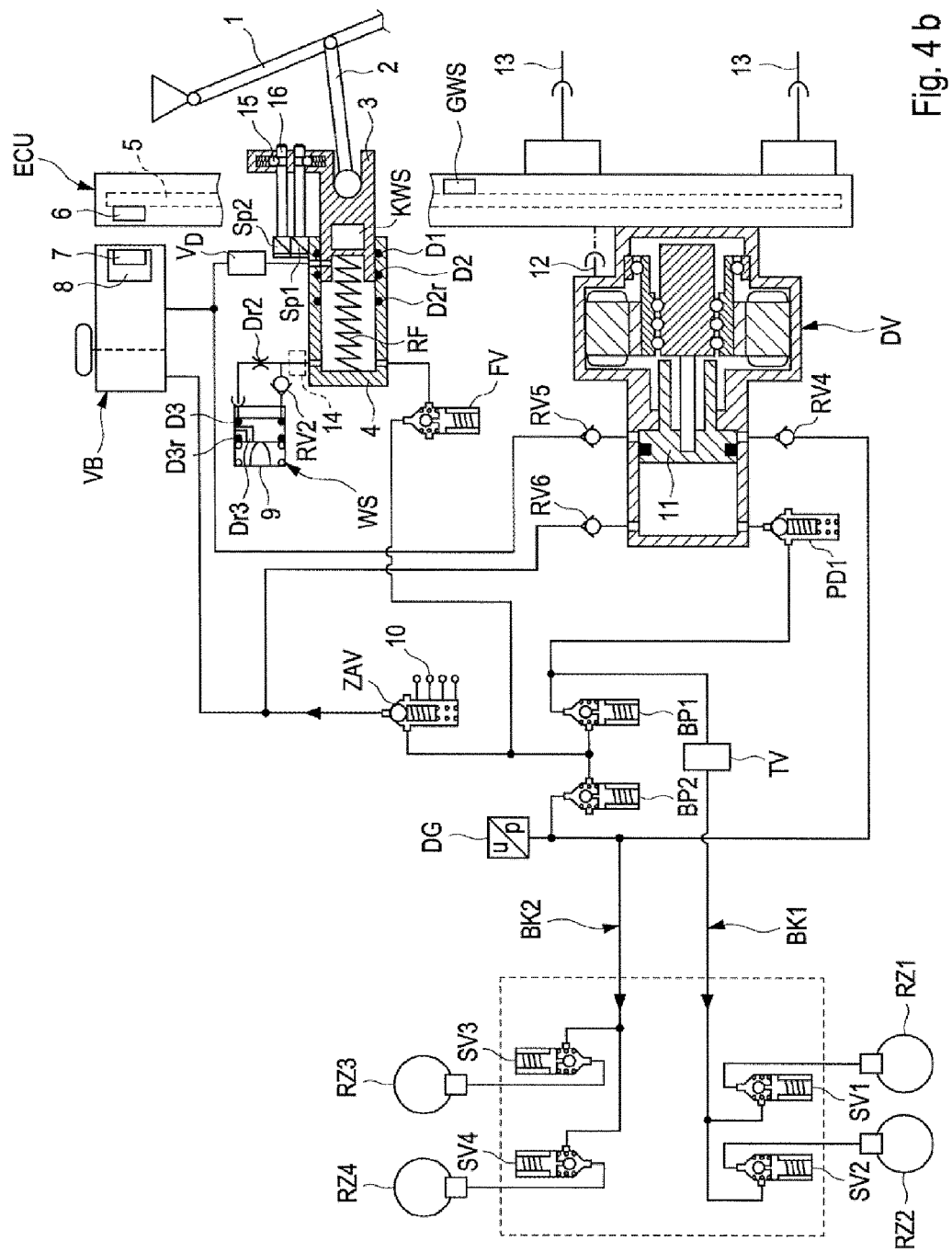
Figure 4:
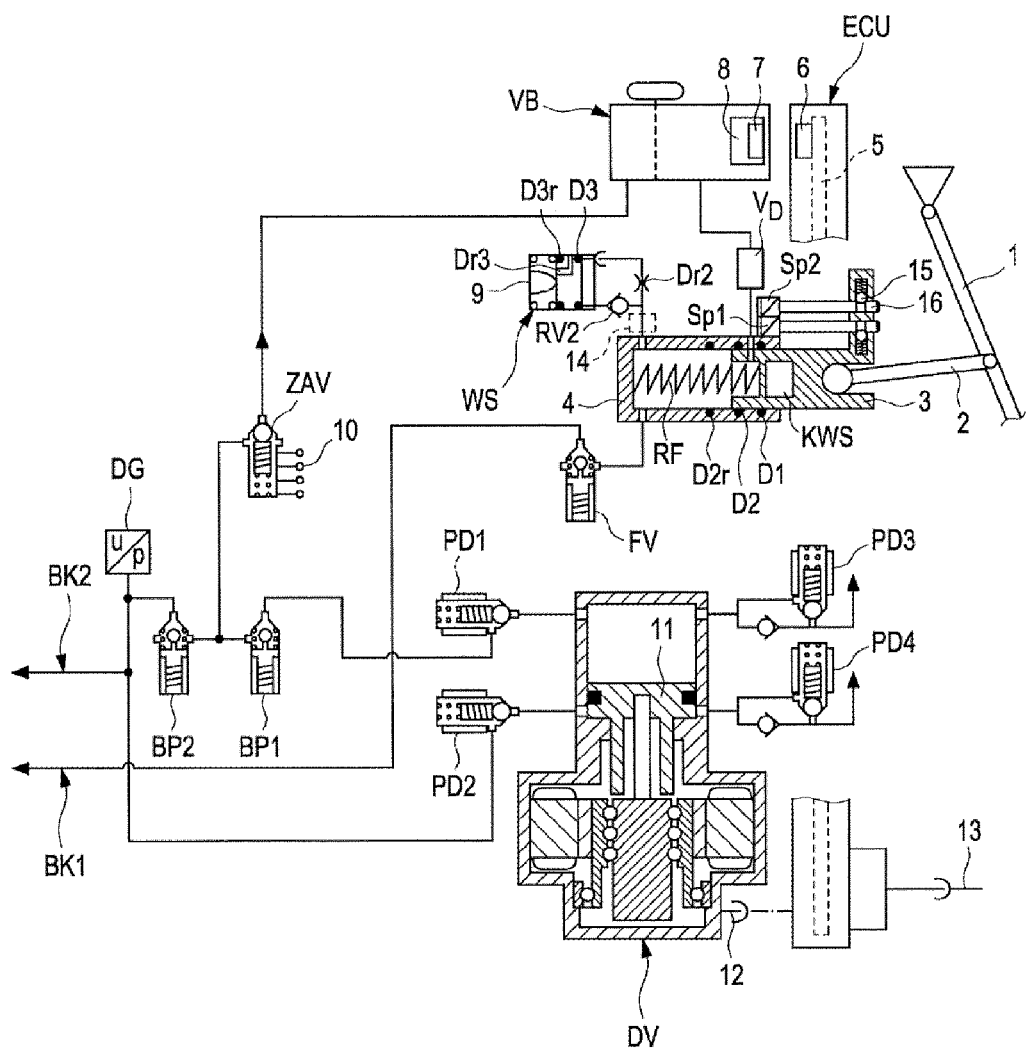

FIG. 4a shows a further embodiment of a brake system according to the invention, wherein, in relation to FIG. 1a and FIG. 1b, the pressure supply device (DV) has, instead of a rotary pump, a two-circuit double-action piston pump, which may have a piston, two pressure chambers, in each case one in front of and behind the piston, and a central rod, wherein the piston can be moved in both directions via the central rod and a transmission with an electromotive drive. For example, the transmission may be implemented as a ball screw drive and the electromotive drive may be implemented as a brushless DC motor or in some other form. The respective configurations of the pressure supply device (DV) described in conjunction with FIGS. 4a-c and FIGS. 5a-b can be used in or with the systems according to the invention as per FIGS. 1a-b and FIGS. 3a-c.

The connection of the wheel cylinders (for example RZ1, RZ2) to a brake circuit (for example BK1) may, as is known in the prior art, be realized by means of in each case one switchable inlet valve (for example EV1, EV2), wherein the wheel cylinders (for example RZ1, RZ2) may then be connected by means of in each case one switchable outlet valve (for example AV1, AV2) to the reservoir (VB). The inlet valves or outlet valves may also be regarded as switching valves. Alternatively, the connection of the wheel cylinders (for example RZ3, RZ4) to a brake circuit (for example BK2) as in FIG. 1a and FIG. 1b may be realized via in each case only one switching valve (for example SV3, SV4), in which case at least one brake circuit may be connected to the reservoir (VB) switchably by means of a central outlet valve (ZAV) and possible further valves. Such a connection can reduce the number of solenoid valves, whereby costs can be saved.

One of the two pressure chambers of the double-action piston pump may be connected to the first brake circuit (BK1) via a hydraulic output of the pump and via a check valve (RV3) which closes toward the pressure provision unit (DV) and via possible further valves. Furthermore, this pressure chamber may be connected to the reservoir (VB) via a suction replenishment inlet (breather opening or opening) of the pump and a further check valve (RV6) which closes toward the reservoir (VB) and via possible further valves. The other pressure chamber may likewise be connected to the second brake circuit via a further hydraulic output of the pump and a check valve (RV4) which closes toward the pressure provision unit (DV) and via possible further valves. Furthermore, said pressure chamber may likewise be connected to the reservoir (VB) via a further suction replenishment inlet (breather opening or opening) of the pump and a further check valve (RV5) which closes toward the reservoir (VB) and via possible further valves. The pump with the two suction replenishment inlets and the two hydraulic outputs and the piston may be designed such that, in both directions of movement of the piston, that is to say both during the forward stroke and during the return stroke, brake fluid can be delivered from the reservoir (VB) into at least one of the two brake circuits (BK1, BK2) and brake pressure can thus be built up, wherein, by definition, the forward stroke refers to the direction of movement of the piston in which brake fluid is forced (in FIG. 4a via RV3) out of that the pressure chamber which is averted from the central rod of the piston. On the other hand, the return stroke refers to the direction of movement of the piston in which brake fluid is forced (in FIG. 4a via RV4) out of the other pressure chamber, wherein the effective piston area of the piston may be smaller in relation to the effective piston area of the piston during the forward stroke.

Depending on the embodiment, the two brake circuits (BK1, BK2) may be switchably connected to one another, as in FIG. 1a, by means of a bypass valve (BP1) or, as in FIG. 1b, by means of a series connection of two bypass valves (BP1, BP2) and by means of further possible valves. In this way, during a forward stroke of the piston in the pressure provision unit (DV), brake pressure can be built up selectively in the first brake circuit (BK1) or in both brake circuits (BK1, BK2). Analogously, during a return stroke of the piston in the pressure provision unit (DV), brake pressure can be built up selectively in the second brake circuit (BK2) or in both brake circuits (BK1, BK2).

In relation to a single-action piston pump, which is likewise common in brake systems but is not illustrated and which can deliver volume into the brake system only in one stroke direction (forward stroke), the brake system according to the invention with a double-action piston pump and an exemplary connection as in FIG. 4a can prove to be advantageous in that the time expended in the case of a single-action piston pump if the piston has to be entirely or partially retracted, with the hydraulic output of the pressure chamber closed, before the replenishing delivery of additionally required brake fluid volume is performed can be saved. During such an idle return stroke, the brake system cannot be charged with pressure by the pressure provision unit (DV). By contrast, in the brake system according to the invention, with the double-action piston pump in FIG. 4a, brake pressure can be provided in the brake circuits (BK1, BK2) continuously by way of alternating forward and return strokes. In this way, in particular, the structural length of the double-action piston pump can be reduced.

The brake system according to the invention with a double-action piston pump and with an exemplary connection as in FIG. 4a can on the other hand prove to be advantageous in that the different sizes of the effective piston areas during the forward and return strokes of the piston can be utilized in the configuration of the transmission and of the electromotive drive for so-called downsizing. With regard to the two pressure ranges that are customary in brake systems—on the one hand a normal pressure range of pressures up to the so-called locking pressure in the case of a high coefficient of friction in the wheel/ground system of for example approximately 100-120 bar, and on the other hand a higher pressure range of pressures up to for example approximately 200 bar—the effective piston areas of the piston, the transmission and the electric motor of the double-action piston pump may preferably be designed such that pressures in the normal pressure range can still be adequately supported during the forward stroke, whereas pressures in the higher pressure range can be supported only by the relatively small piston rear side. Forward strokes with the relatively large piston rear side can prove to be advantageous in particular if, during the filling of the wheel cylinder, it is firstly necessary for the clearance of the brakes to be overcome as quickly as possible, in which clearance the brake pressure rises relatively slowly. Return strokes with the relatively small piston rear side can prove to be advantageous in particular if the pressure rises significantly after the clearance of the brakes has been overcome and, as the pressure greatly increases, less brake fluid volume has to be delivered.

In a design with downsizing, during the pressure build-up $P_{build-up}$, after a return stroke in the higher pressure range, an idle pre-stroke may be required, whereby, for example with closed switching valves (for example SV3, SV4) and inlet valves (for example EV1, EV2), a closed infeed switching valve (FV), if present, a preferably closed second bypass valve (BP2), an opened first bypass valve (BP1) and an opened central outlet valve (ZAV), brake fluid can be conveyed from the pressure chamber with the larger effective piston area into the reservoir (VB). Such an idle pre-stroke may last up to approximately 100 ms, but only needs to be used very seldom. Subsequently, the pressure build-up $P_{build-up}$ can be continued in the higher pressure range by way of a further return stroke.

As in the case of the rotary pumps in FIG. 1a and FIG. 1b, the pressure reduction $P_{reduction}$ in the brake circuits (BK1, BK2) may be realized in the normal situation via a central outlet valve (ZAV) or further (central) outlet valves (ZAV2) or, in the event of a fault, via the infeed switching valve (FV) and the single master cylinder. By contrast to a pressure reduction $P_{reduction}$ such as an ABS intervention via outlet valves (for example AV1, AV2) at each brake cylinder (for example RZ1, RZ2), a pressure reduction $P_{reduction}$ via the switching valves (for example SV3, SV4) and a central outlet valve (ZAV), wherein the switching valves and/or the bypass valves (BP1, BP2) can be controlled by means of pulse width modulation (PWM), can be regarded as advantageous with regard to the accuracy in pressure differences between the individual wheel cylinders (RZ1, RZ2, RZ3, RZ4) and/or brake circuits (BK1, BK2). The generation of noise can also be reduced to a certain minimum in this way. The piston of the double-action piston pump can, in the case of a complete pressure reduction $P_{reduction}$, be brought by means of its electromotive drive back into its initial position via a return stroke, wherein brake fluid volume is delivered from the pressure chamber with the smaller piston effective area likewise via at least one of the bypass valves (BP1, BP2) and the central outlet valve (ZAV) into the reservoir (VB).

Owing to the check valves (RV5, RV6) that close toward the reservoir (VB) in the connection of the double-action piston pump to the reservoir (VB), it is possible in particular for the (partial) evacuation and ventilation of both pressure chambers of the double-action piston pump to be performed in this embodiment only via the hydraulic outputs of the pump, the respective check valves (RV3, RV4) and the respective brake circuits (BK1, BK2).

FIG. 4b shows a further embodiment in which, in relation to FIG. 4a, it is preferably the case that the check valve (RV3) at the pump output of the pressure chamber with the larger effective area is replaced by a switchable solenoid valve (PD1). As in FIG. 4a, the brake circuits (BK1, BK2) may be connectable by means of a bypass valve (BP1) or by means of a series connection of two bypass valves (BP1, BP2). Furthermore, a further switchable isolation valve (TV) may be used in the first brake circuit (BK1).

During a forward stroke of the piston, the switchable solenoid valve PD1 can be opened, and pressure can be built up in the brake circuits (BK1, BK2) as in FIG. 4a. On the other hand, during a return stroke of the piston, the switchable solenoid valve PD1 can be closed, such that, during the pressure build-up $P_{build-up}$, no brake fluid volume has to be delivered back from the brake circuits (BK1, BK2) into the pressure chamber with the larger effective piston area.

By contrast to the embodiment in FIG. 4a, it is possible in the embodiment in FIG. 4b for the switchable solenoid valve PD1 to be opened after a forward stroke for the purposes of a pressure reduction $P_{reduction}$, whereby, for example, brake fluid volume can flow back via opened switching valves (SV1, SV2, SV3, SV4), opened bypass valves (BP1, BP2) and, if present, an opened isolation valve (TV) in the first brake circuit (BK1), and with the central outlet valve (ZAV) closed and the infeed switching valve (FV) closed, from the brake circuits (BK1, BK2) into that pressure chamber of the double-action piston pump which has the larger piston effective area. Since, here, brake fluid is simultaneously delivered from the pressure chamber with the smaller effective piston area into the second brake circuit, such a pressure reduction $P_{reduction}$ may be incomplete.

In the hydraulic connection of the double-action piston pump in FIG. 4a, further check valves (RV3, RV4, RV5, RV6) at the pump inputs and outputs may be replaced by in each case one switchable solenoid valve (PD1, PD2, PD3, PD4). For example, FIG. 4c shows a further embodiment in which all check valves (RV3, RV4, RV5, RV6) are replaced by solenoid valves. As in FIG. 4a, the brake circuits may be connected by means of a bypass valve (BP1) or by means of a series connection of two bypass valves (BP1, BP2). In the embodiment in FIG. 4c, the single master cylinder, which may furthermore have a force-travel sensor (KWS) in the piston for the purposes of pedal force measurement, may for example also be connected directly to the first brake circuit (BK1) via the infeed switching valve (FV). In the embodiment as per FIG. 4a, a redundant central outlet valve (ZAV2) may be used, which is connected for example to the first brake circuit (BK1).

By means of different combinations of open and closed solenoid valves (PD1, PD2, PD3, PD4), different operating states of the double-action piston pump can be set. As in FIG. 4b, during the pressure reduction $P_{reduction}$, brake fluid can be returned from the brake circuits (BK1, BK2) to the double-action piston pump for example via PD1. In addition, by opening a pump input (for example PD3) and closing the associated pump output (for example PD1), brake fluid can be delivered from the respective pressure chamber into the reservoir (VB).

Figure 5:
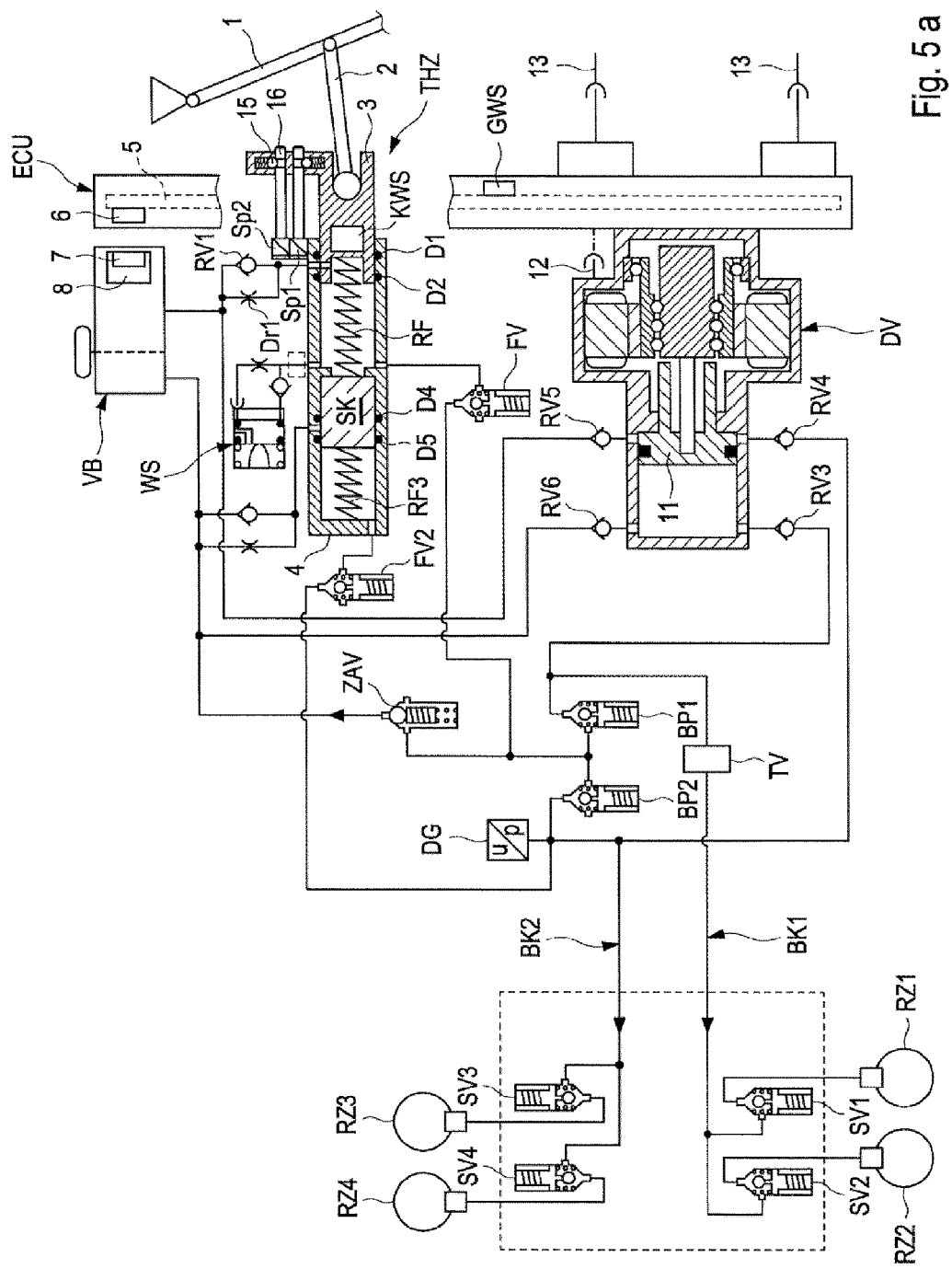
FIG. 5a shows an embodiment according to the invention with a conventional tandem master cylinder unit (THZ) and with a two-circuit double-action piston pump with four check valves (RV3, RV4, RV5, RV6).
FIG. 5b shows an embodiment according to the invention with a tandem master cylinder unit (THZ) with plunger and with a two-circuit double-action piston pump with four check valves (RV3, RV4, RV5, RV6).
Figure 5:
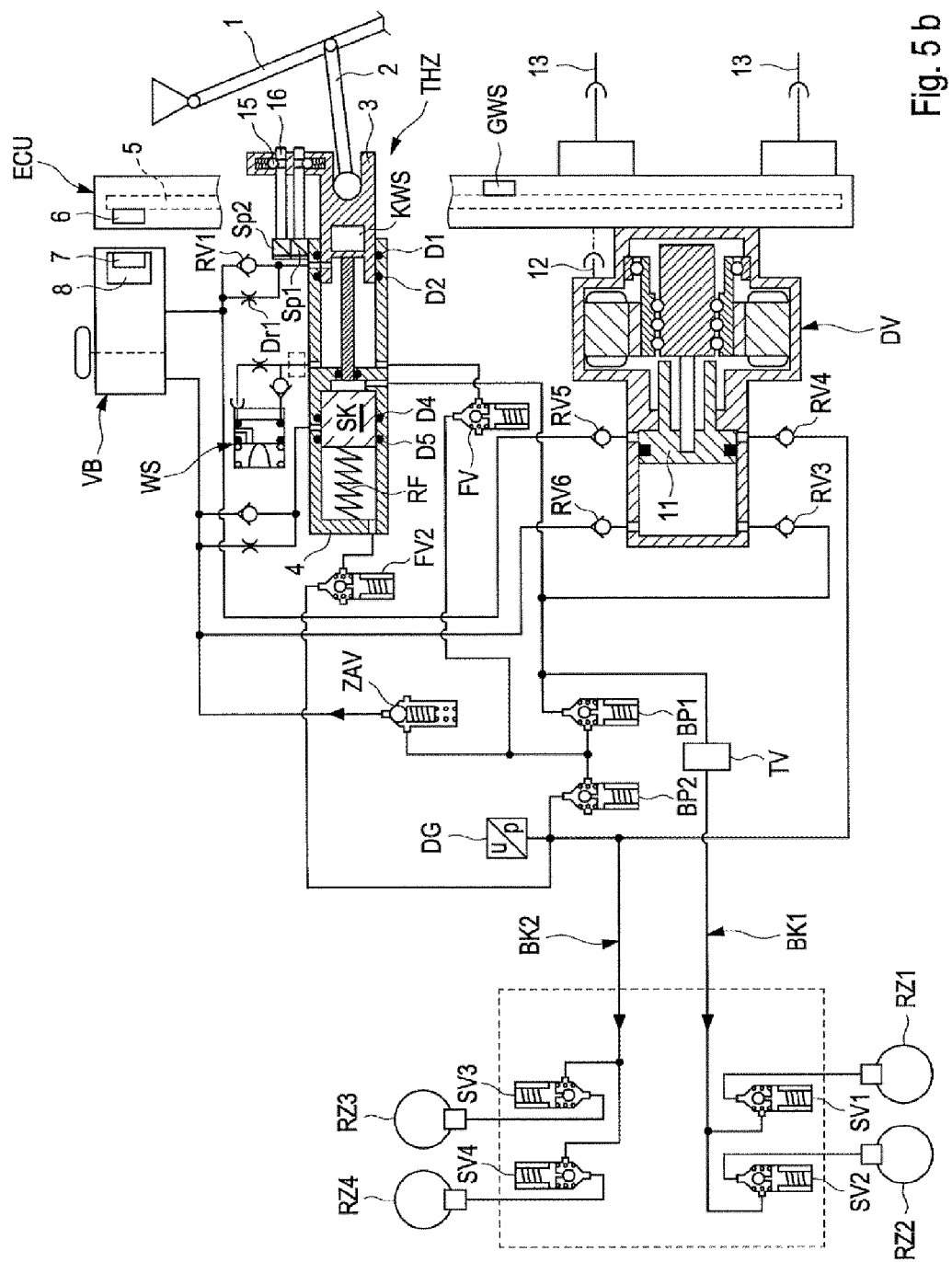

FIG. 5a shows a further embodiment which, in relation to FIG. 4a, has a tandem cylinder (THZ) instead of a single master cylinder (SHZ). The piston (3) of the brake pedal device may be coupled via a first pressure chamber and a first resetting spring (RF) to a second, so-called floating piston (SK), which in turn can be moved in a further pressure chamber counter to a second resetting spring (RF3). As in FIG. 4a, it is for example possible for a first pressure chamber between the piston (3) and the floating piston (SK) of the tandem master cylinder (THZ) to be connected via a hydraulic output and a first infeed switching valve (FV) to the hydraulic line between the first bypass valve (BP1) and the central outlet valve (ZAV). The travel simulator (WS) can be connected to the tandem master cylinder (THZ) via, for example, a further hydraulic output of the first pressure chamber and, if present, the travel simulator isolation valve (14). According to the invention, it is furthermore possible for the second pressure chamber of the tandem master cylinder (THZ) to be connected via a further hydraulic output and a second infeed switching valve (FV2) and possible further valves to the second brake circuit (BK2), wherein the second infeed switching valve (FV2) may preferably, for a fall-back level, be designed as a solenoid valve which is open when electrically deenergized. Both pressure chambers of the tandem master cylinder (THZ) may have in each case one breather opening or opening, which can be sealed off for example by at least in each case one primary (D2, D5) and secondary seal (D1, D4) and which can in each case, for example as in FIG. 1a, be connected to the reservoir (VB) via a parallel connection of a throttle and a check valve which closes toward the reservoir (VB). Optionally, the hydraulic connections between the pressure chambers of the tandem master cylinder and the reservoir (VB) may also be implemented, as in FIG. 1b and FIG. 3b, via diagnostic valves ($V_D$) or, as in FIG. 3c, via the reservoir shut-off valve (17) or, if a redundant primary seal (D2, D5) is present, via a hydraulic line.

In the normal situation, the first infeed valve (FV) and the second infeed switching valve (FV2) may be closed during a braking operation, wherein, then, the pressure provision unit (DV) can build up brake pressure in the brake circuits (BK1, BK2) by way of "brake-by-wire" and corresponding valve switching in the hydraulic control unit (HCU).

In relation to a single master cylinder (SHZ), the use of a tandem master cylinder (THZ) can reduce the probability of a total failure of the master cylinder even without further redundant primary or secondary seals.

FIG. 5b shows a further embodiment which, in relation to FIG. 5a, has a tandem master cylinder (THZ) with a plunger. The piston (3) of the brake pedal device can be moved in a first pressure chamber between the piston (3) and the floating piston (SK) and coupled to a further plunger and a further piston, which in turn can be moved into a second pressure chamber counter to a resetting spring. The hydraulic connection and the function of this tandem master cylinder (THZ) is as in FIG. 5a. The check valve RV3 is connected via a further hydraulic line and via a further opening in the tandem master cylinder to the rear chamber of the floating piston (SK).

LIST OF REFERENCE DESIGNATIONS

RB1-4 Wheel brake
RZ1-4 Wheel cylinder
SV1-4 Switching valves
EV1-4 Inlet valves
AV1-4 Outlet valves
BK1, BK2 Brake circuit
DG, DG2 Pressure sensor
SHZ Single master cylinder unit
THZ, DHZ Tandem master cylinder unit or, synonymously, double master cylinder
KWS Force-travel sensor
GWS Yaw angle sensor
Sp1, Sp2 Pedal travel sensor
Sp Pedal travel
Fp Pedal force
BP1, BP2 Bypass valve
ZAV, ZAV2 (Central) outlet valve
FV, FV2 Infeed switching valve
TV Isolation valve
RV1-6 Check valve
DV Pressure provision unit
HCU Hydraulic control unit
ECU Electronic control unit
VB Reservoir
WS Travel simulator
SK Floating piston of the tandem master cylinder D1 Secondary seal of the master cylinder
D2 Primary seal of the master cylinder
D3 Primary seal of the travel simulator
D4 Secondary seal of the floating piston
D5 Primary seal of the floating piston
D1r Redundant secondary seal of the master cylinder
D2r Redundant primary seal of the master cylinder
D3r Redundant primary seal of the travel simulator
Dr1, Dr4 Throttle in the connection between master cylinder and reservoir
Dr2 Throttle in the connection between master cylinder and travel simulator
Dr3 Throttle in the travel simulator
Dr5 Throttle in the back pressure valve 19
$V_D$ Diagnostic valve
RF, RF1-3 Resetting spring
PD1-4 Solenoid valves in the connection of the two-circuit double-action piston pump
F Spring
1 Brake pedal
2 Pedal plunger
3 Master cylinder piston
3a Part of the master cylinder piston
4 Master cylinder housing
5 PCB
6 Fill level sensor element
7 Sensor target
8 Float in the reservoir
9 Electronic elements for travel simulator for force characteristic
10 Redundant electrical connection of the infeed switching valve
11 Double-action piston with spindle drive
12 Redundant connection to motor for 2×3 phase winding
13 Electrical plug connector for on-board electrical system connection
14 Travel simulator isolation valve
15 Detent ball
16 Sensor rod
17 Reservoir shut-off valve
18 Ball valve
19 Back pressure valve
20 Valve plate
21 Force-travel characteristic for the brake pedal

What is claimed is:

1. A brake system for a vehicle, comprising the following components:
    one or more hydraulic brake circuits with at least one hydraulically acting wheel brake;
    at least one pressure supply device, which is connected via a hydraulic line to at least one of the hydraulic brake circuits; and
    a hydraulic brake pedal system having a single master cylinder with exactly one pressure chamber, a hydraulic output of which is coupled, in a manner switchable by means of an infeed switching valve, to at least one of the hydraulic brake circuits, and wherein the single master cylinder is, by way of at least one opening, coupled by means of a hydraulic connection to a reservoir;
    wherein a failure of a pressure chamber seal of the pressure chamber of the single master cylinder is safeguarded against by means of at least one redundancy, wherein the redundancy comprises a first throttle and/or a third seal that is redundant with respect to either a primary seal or a secondary seal,
    wherein failure of the primary seal, failure of the secondary seal, or failure of the third seal of the pressure chamber of the master cylinder is diagnosable,
    wherein the single master cylinder includes the primary seal, the secondary seal, and the third seal.

2. The brake system as claimed in claim 1, wherein the opening is sealed off by at least the primary seal of the pressure chamber of the master cylinder, and further comprising an open-loop and closed-loop control unit adapted to diagnose failure of the primary seal using pedal travel sensors and a force-travel sensor able to ascertain a pedal force and/or a pressure transducer.

3. The brake system as claimed in claim 1, wherein at least one of the hydraulic connections to the reservoir comprises:
    the first throttle;
    the first throttle and a check valve;
    a second throttle and a switchable solenoid valve; or
    a switchable solenoid valve.

4. The brake system as claimed in claim 1, wherein the pressure chamber of the hydraulic brake pedal system is connected by means of a hydraulic valve circuit to a travel simulator having at least one pressure chamber, wherein a failure of a pressure chamber seal of the at least one pressure chamber of the travel simulator is safeguarded against by means of at least one further redundancy, and wherein the failure of the pressure chamber seal of the at least one pressure chamber of the travel simulator is diagnosable.

5. The brake system as claimed in claim 4, wherein the at least one pressure chamber of the travel simulator is sealed off by means of a travel simulator seal, wherein the travel simulator seal is the pressure chamber seal of the at least one pressure chamber of the travel simulator, wherein the at least one pressure chamber of the travel simulator has at least one second travel simulator seal that is redundant with respect to the travel simulator seal, and which serves for pressure chamber sealing of the at least one pressure chamber of the travel simulator, wherein the at least one further redundancy comprises the at least one second travel simulator seal.

6. The brake system as claimed in claim 5, wherein the travel simulator has a travel simulator opening between the travel simulator seal and the at least one second travel simulator seal, wherein the travel simulator opening is connected via a third throttle to the reservoir, wherein the at least one further redundancy comprises the at least one second travel simulator seal and the third throttle.

7. The brake system as claimed in claim 5, wherein the open-loop and closed-loop control unit is adapted to diagnose failure of the travel simulator seal.

8. The brake system as claimed in claim 2, further comprising a travel simulator having a pressure chamber with a travel simulator seal, wherein the open-loop and closed-loop control unit is further adapted to diagnose a failure of the travel simulator seal using the force-travel sensor and/or the pressure transducer.

9. The brake system as claimed in claim 1, wherein the hydraulic connection has a parallel circuit of the one throttle and a check valve which closes in the direction of the reservoir.

10. The brake system as claimed in claim 1, wherein the master cylinder has at least one further secondary seal which is redundant with respect to the secondary seal.

11. The brake system as claimed in claim 10, wherein the single master cylinder has a further opening between the secondary seal and the at least one further secondary seal, wherein the further opening is connected via a further throttle to the reservoir.

12. The brake system as claimed in claim 1, wherein the single master cylinder has at least one redundant primary seal that is redundant with respect to the primary seal.

13. The brake system as claimed in claim 10, wherein the hydraulic connection has a switchable solenoid valve.

14. The brake system as claimed in claim 13, wherein the single master cylinder has, between the at least one further secondary seal and the secondary seal, at least one further opening which is connected via a further throttle to the reservoir.

15. The brake system as claimed in claim 1, wherein the single master cylinder has two hydraulic lines to the reservoir, wherein each of the two hydraulic lines has a throttle.

16. The brake system as claimed in claim 1, wherein the single master cylinder has two hydraulic lines to the reservoir; wherein the two hydraulic lines have a throttle and a check valve; or wherein the two hydraulic lines have two throttles and a check valve.

17. The brake system as claimed in claim 1, wherein the opening is further sealed off by at least one secondary seal.

18. The brake system as claimed in claim 3, wherein at least one hydraulic connection to at least one further hydraulic line between the single master cylinder and the reservoir comprises:
- a throttle;
- a throttle and a check valve;
- a further throttle and a switchable solenoid valve; or
- a switchable solenoid valve.

19. The brake system as claimed in claim 1, wherein the open-loop and closed-loop control unit is adapted to diagnose a failure of the secondary seal, using the pressure supply device.

* * * * *